United States Patent [19]
Conrad et al.

[11] Patent Number: 5,682,539
[45] Date of Patent: Oct. 28, 1997

[54] ANTICIPATED MEANING NATURAL LANGUAGE INTERFACE

[76] Inventors: Donovan Conrad, 19107 SE. 47th Pl., Issaquah, Wash. 98027; Charles Cosby, 10925 165th Pl. NE., Redmond, Wash. 98052

[21] Appl. No.: 315,240

[22] Filed: Sep. 29, 1994

[51] Int. Cl.⁶ .................................................. G06F 17/28
[52] U.S. Cl. .................................................. 395/759
[58] Field of Search .................... 364/419.08, 419.07, 364/419.13, 419.14; 395/600

[56] References Cited

U.S. PATENT DOCUMENTS

| | | |
|---|---|---|
| 4,670,848 | 6/1987 | Schramm . |
| 4,931,926 | 6/1990 | Tanaka et al. . |
| 4,974,191 | 11/1990 | Amirghodsi et al. . |
| 5,056,021 | 10/1991 | Ausborn ............................ 364/419.08 |
| 5,095,432 | 3/1992 | Reed ................................. 364/419.08 |
| 5,197,005 | 3/1993 | Shwartz et al. . |
| 5,255,386 | 10/1993 | Prager . |
| 5,321,608 | 6/1994 | Namba et al. ..................... 364/419.08 |
| 5,369,572 | 11/1994 | Masegi et al. ..................... 364/419.08 |
| 5,371,807 | 12/1994 | Register et al. ........................ 382/14 |
| 5,377,103 | 12/1994 | Lamberti et al. .................. 364/419.08 |
| 5,404,506 | 4/1995 | Fujisawa et al. ........................ 395/600 |
| 5,424,947 | 6/1995 | Nagao et al. ....................... 364/419.08 |

*Primary Examiner*—Robert A. Weinhardt
*Assistant Examiner*—Gita Shingala
*Attorney, Agent, or Firm*—Graybeal Jackson Haley LLP

[57] ABSTRACT

An anticipated meaning natural language interface system for computer applications. A knowledge engineer anticipates the general meaning of each sentence that a user is likely to enter and builds a structure of general meaning nodes. For each node, the knowledge engineer enters one or more typical sentences to represent the general meaning. A knowledge engineer abstracts the typical sentences and stores the abstractions in a knowledge base. When a user enters a sentence, it is abstracted by the system and compared to abstracted typical sentences in the knowledge base. This information, and other available information, is used by an algorithm to determine which of the general meaning nodes is intended by the user.

13 Claims, 15 Drawing Sheets

| KNOWLEDGE BASE |
|---|
| Actions |
| Sentences |
| Sentence Classes |
| Words |
| Word Categories |
| Hole Attributes |
| Sentence Records |
| Conversation Organization |
| Responses |
| Node Actions |
| Object Terms |
| Location Terms |
| Cross References |

Fig. 1

ACTIONS

| number | application | description |
|--------|-------------|-------------|
| 01 | 0 | Enter help mode |
| 02 | 0 | Exit help mode |
| 03 | 0 | Exit system |
| 04 | 1 | Display report |
| 05 | 1 | Add field to report |
| 06 | 1 | Delete field from report |
| 07 | 1 | Make field into a subheading |
| 08 | 1 | Select a printer |
| 09 | 1 | Reprint the current report |
| 10 | 1,2 | Display a field list for a file |
| 11 | 1,2,3,5 | Display a file list and print it |
| 12 | 1,2,4 | Display a reports list |
| 13 | 1,2,3 | Save report under new name |
| 14 | 1,2,3,4,5 | High / low range limit |
| 15 | 2,3 | Activate specified furnaces |

Fig. 2

WORDS

| number | test | categories and weights | synonym | antonym | word weight |
|---|---|---|---|---|---|
| 0001 | division | 01-2<br>04-5<br>15-9 | | | 5 |
| 0002 | div | 01-2<br>04-5<br>05-5 | 0001 | | 5 |
| 0003 | earlier | 01-2<br>18-7 | | | 7 |
| 0004 | jobs | 01-4<br>04-5 | | | 5 |
| 0005 | later | 01-2<br>18-7 | | 0003 | 7 |
| 0006 | the | 01-1 | | | 2 |

Fig. 3

HOLE ATTRIBUTES

| number | description |
|---|---|
| 01 | field name |
| 02 | low range |
| 03 | high range |
| 04 | low date |
| 05 | high date |
| 06 | select |
| 07 | report name |
| 08 | file name |
| 09 | printer name |
| 10 | conversation reference |
| 11 | field type |
| 12 | field length |

Fig. 4

SENTENCE RECORDS

| number | key pattern | hole attributes | action numbers | sentence class |
|---|---|---|---|---|
| 001 | 2156,<04>,<05>,1589 | 2-02;2,3-05;3-07 | | 005 |
| 002 | 1067,<15>,0456,<12> | 2,4-03;4-13 | 6 | 012,132 |
| 003 | 2673,0278,<18><11> | 3-04 | | 045 |
| 004 | 2156,<05>,<14>,37,<14>1589 | 2-01;3-02;5-03 | 14,15 | 005,193 |

Fig. 5

RESPONSES

| number | text to be displayed |
|---|---|
| 001 | Too vague. Please be more specific. |
| 002 | What starting date do you want? |
| 003 | The <04> report has been sent to the printer. Would you like more information? |

Fig. 7

NODE ACTIONS

| app | task | con | version | sequence | response | action numbers | action stack |
|---|---|---|---|---|---|---|---|
| 0 | 13 | 67 | 1 | 2 | 003 | 02,17 | See Fig. 13 |
|  |  |  |  |  |  |  |  |
|  |  |  |  |  |  |  |  |

Fig. 8

OBJECT TERMS

| no. | words | internal name | file name | field name | data value pointer to a field name |
|---|---|---|---|---|---|
| 001 | 239,576,1038 | FD1028 | --- | FLIGHT_NUM | --- |
| 002 | 234,9874 | VTCV.KB | FLIGHT_SCH | --- | --- |
| 003 | 34,9987,345,87 | LPT2 | --- | --- | --- |
| 004 | 624 |  | --- | PROJECT_ID | Scotch Pines |

Fig. 9

LOCATION TERMS

| number | words | app-task-con |
|---|---|---|
| 004 | 239,576,1038 | 1,13,456 |
| 005 | 234,9874 | 2,5,89 |
| 006 | 34,9987,345,87 | 1,21,4 |
| 007 | 239,576 | |
| 008 | 234 | |
| 009 | 34,9987,345,87 | |

Fig. 10

CROSS REFERENCE RECORDS

| no. | current atcvs | sentence class | sentence number | key basis | new atcvs | term no. |
|---|---|---|---|---|---|---|
| 01937 | 1, 3, 1000, --, -- | 026 | --- | 4 | 1, 3, 1000, 300, 25 | 783 |
| 01938 | 1, 3, --, --, -- | 054 | --- | 3 | 1, 2, 800, 110, 90 | 811 |
| 01939 | 1, 3, 1000, 400, 100 | 001 | 000418 | 1 | 1, 3, 1000, 400, 15 | --- |

Fig. 11

ATCVS STACK

| | application | task | conversation | version | sequence |
|---|---|---|---|---|---|
| current | | | | | |
| last | | | | | |
| 2 ago | | | | | |
| 3 ago | | | | | |
| 4 ago | | | | | |

Fig. 12

Action Stack

| Seq Number | Action Code | Data Req'd? | Object Name or Data Area |
|---|---|---|---|

| | | |
|---|---|---|
| Seq Number | The line number of a record in the action stack | |
| Action Code | see figure 2 | |
| Data Req'd? | ( Yes or No) - indicates that some form of data is required. This data may originate from the system or the application | |
| Object or Data | Allows the KE to tag the name, as variable or hard data required when the preceeding field is a "Yes" | |

Example

| Seq Number | Action Code | Data Req'd? | Object Name or Data Area |
|---|---|---|---|
| 00002 | 18 | Yes | idsmoooa |
| 00003 | 22 | No | |
| 00004 | 16 | No | |
| 00005 | etc | etc | etc |

Seq 1 - Action - Execute application process as a report, but don't output, instead, send the results to the system
- Data? - To fulfill this action, the system must tell the application which process to execute.
- Name - Name of the application process; an object term Seq 2 - Action - Clear all range commands in the CFVS, except for date ranges Seq 3 - Action - Accept any range command in current input sentence

Fig. 13

Word Numbers and Categories
(Before Term Rejection)

| Word | 2 | 3 | 4 | 5 | 6 |
|---|---|---|---|---|---|
| 0091 | 2031 | 4901 | <14> | 0015 | <11> |
| <04> | <04> | <04> | | <14> | |
| <05> | <05> | <15> | | <04> | |
| <15> | <15> | <16> | | <05> | |

(256 Possible Patterns)

Fig. 14

Interim Sentence Canidate Key Patterns
(After Hole Compression)

| Word | 2 | 3 | 4 | 5 | 6 |
|---|---|---|---|---|---|
| 0091 | 2031 | 4901 | <14> | 0015 | <11> |
| 0091 | 2031 | 4901 | <14> | <05> | <11> |
| 0091 | <04> | 4901 | <14> | 0015 | <11> |
| * | * | * | * | * | * |
| * | * | * | * | * | * |
| * | * | * | * | * | * |
| <04> | 4901 | <14> | 0015 | <11> | |
| <04> | 4901 | <14> | <05> | <11> | |

(12 Possible Patterns)

Fig. 16

Word Numbers and Categories
(After Term Rejection)

| Word | 2 | 3 | 4 | 5 | 6 |
|---|---|---|---|---|---|
| 0091 | 2031 | 4901 | <14> | 0015 | <11> |
| <04> | <04> | | | | |
| | <05> | | | | |
| | | | | <05> | |

Fig. 15

Final Sentence Canidate Key Patterns
(After Matching to Typical Sentences)

| Word | 2 | 3 | 4 | 5 | 6 |
|---|---|---|---|---|---|
| 0091 | <05> | 4901 | <14> | <05> | <11> |
| <04> | 4901 | <14> | <05> | <11> | |

Fig. 17

Initial Sentence Weighting Table

| Term | XRCS | Holes | Cat Weight | ATCVS Stack | Total Weight |
|------|------|-------|------------|-------------|--------------|
| Test 1 | 2 | 3 | 4 | 5 | 6 |

Fig. 18

| Term | | | | | |
|------|--|--|--|--|--|

Test 1
  0 = Pass
 -30 = Fail

Fig. 19

| | XRCS | | | | |
|--|------|--|--|--|--|

Test 2
  0 = 1 or more cross references found
 -30 = no cross reference met minimum Criteria

Fig. 20

| | | Holes | | | |
|--|--|-------|--|--|--|

Test 3
  Value = 2 * the number of Holes

Fig. 21

| | | | Cat Weight | | |
|--|--|--|------------|--|--|

Test 4

$$\text{Value} = \frac{(\text{Sum of Category Weights}) + (\text{Sum of Word Weights})}{\text{Number of Holes in Sentence}}$$

Fig. 22

| | | | | ATCVS Stack | |
|--|--|--|--|-------------|--|

Test 5
  Value = (-5 * the number of Stack Positions)

Fig. 23

Initial Sentence Weighting Table
(Post Test Processing)

| Term | XRCS | Holes | Cat Weight | ATCVS Stack | Total Weight |
|---|---|---|---|---|---|
| 0 | 0 | 4 | 12 | -10 | 6 |
| 0 | -30 | 8 | 21 | 0 | -1 |

Sentence number 1
    Test 1    All Terms on file
    Test 2    Cross Reference found
    Test 3    Two Holes in sentence
    Test 4    (Category + Word Weights) / Number of Holes
    Test 5    XRCS Fires only from node ATCVS n-2

Sentence number 2
    Test 1    All Terms on file
    Test 2    No Executable XRCS found
    Test 3    Four Holes in Sentence
    Test 4    (Category + Word Weights) / Number of Holes
    Test 5    Not Applicable, No XRCS found in Test 2

ANTICIPATED MEANING NATURAL LANGUAGE INTERFACE

The invention is a method for a computer system, with a limited universe of possible functions, to be directed to those functions by natural language user input. With this method, a knowledge engineer can build a system for recognizing any language or combination of languages received from any source, including keyboard or voice recognition.

BACKGROUND

The invented system is used on a general purpose computer as an interface for other computer applications. Most computer applications, such as database query and reporting systems and input control devices, are controlled with highly specific commands. The commands may be entered at a keyboard, selected with a mouse, or input with voice recognition. However, because the commands are highly specific, an attempt by a user to enter natural language as a command will seldom be recognized by the application.

Computer scientists have long sought successful natural language interfaces for computer systems. Some of the more successful previously invented systems are based on artificial intelligence methods comprising either a knowledge base with a large set of rules and a rule-based inferencing engine or a neural network system. These systems attempt to derive meaning from user input sentences either by identifying concepts within the sentences or by using the rules of grammar to parse sentences to identify subjects, verbs, objects, and other parts of speech to then determined meaning from knowing the part of speech involved. The invented system uses none of these methods.

SUMMARY OF THE INVENTION

The invented system solves the problem of devising a natural language interface for directing a computer system to perform a limited and manageable number of functions. Limitations of the system are that it cannot derive useful meaning from user input which is unrelated to the functions of the system and it cannot function as an interface for a system with an unbounded number of possible functions. However, most or all of the presently known useful computer systems fit these limitations.

The invented system can act as an interface for numerous applications which may be running concurrently. The applications may be of any type, performing any function, including such functions as controlling an input derive which passes input from the user to the invented system. An example of such an applications would be software performing voice recognition which generates character strings representing words of a natural language for input to the invented system.

To build the system, a knowledge engineer anticipates likely intended meanings to be input by a user. For each meaning, he designs a set of actions, including a textual response to the user which will often include a question soliciting a specific or yes or no answer. With each possible functions of the user interface and the underlying applications in mind, the knowledge engineer anticipates all of the dialogs and branches of dialogs that a user is likely to pursue while leading the user to one or more possible functions of the system. By this process, the knowledge engineer anticipates each of the meanings that a user might intend in each dialog.

To build a knowledge base from which the system can recognize each of these user-intended meanings, the knowledge engineer enters one or more typical sentences that a user might be expected to enter, each of which represents the anticipated meaning. Information is abstracted from each such typical sentence to build a knowledge base. This method may be summarized in greater detail as follows:

For the computer, the application, and the interface itself (the system), a knowledge engineer identifies each specific object of the system, including functions and elements, that a user is likely to wish to direct or query about. The knowledge engineer then enters object terms consisting of all of the words, and synonyms for those words, that a user is likely to use to refer to such specific objects, the object to which the term refers, and, for some of the terms, adds additional information about the meaning of the term.

The knowledge engineer builds, and stores in the knowledge base, a structure of nodes of likely user-system conversational exchanges, each node having a single use input general meaning. As a rule for the knowledge engineer to decide whether two user input meanings are sufficiently close that they should be represented by one general meaning node rather than two, two different sentences have the same general meaning of object terms may be transferred from the first sentence to equivalent locations in the second and the second sentence then has the same meaning as the first.

For each node, the knowledge engineer specifies a programmed action to be executed when the node is selected, which action may include a responsive sentence or question directed to the user. The programmed action contains object category codes in place of specific objects, so that specific objects can later replace the category codes.

For each node, the knowledge engineer enters one or more typical sentences which convey the general meaning of user input. From these sentences, a list of words is created in the knowledge base.

In each typical sentence, the knowledge engineer identifies node terms and node group terms, which are single words and word combinations which suggest that a particular node or group of nodes may contain the intended general meaning of the typical sentence. The knowledge engineer adds the node terms and the node group terms to the knowledge base, and, for some of them, adds information about them.

In each typical sentence, the knowledge engineer replaces each object term, each node term, and each node group term with a category code to generate a typical sentence pattern and stores the resulting pattern in the knowledge base. To each word and each category code for each word the knowledge engineer assigns a weight value to reflect the significance of the word.

When a user inputs a sentence, the system:

(a) identifies the words used and finds the weights of each word;

(b) identifies object terms within the sentence;

(c) identifies node terms and node group terms within the sentence;

(d) replaces the terms with category codes to generate one or more input sentence patterns and compares each pattern to typical sentence patterns in the knowledge base;

(e) gathers information on prior node locations from a record of prior exchanges;

(f) gathers information from the prior nodes about the subjects of prior exchanges;

(g) identifies user input object terms from prior exchanges; and (h) identifies user input node terms and node group terms from prior exchanges.

From these eight sources of information, the system calculates a probability as to which of the general meaning nodes is most likely intended by the user. The system takes specific object meaning from the object terms of user input or recent exchanges, substitutes the specific object meanings in place of category codes in the programmed action, and executes the action.

If the system cannot find a general meaning node that appears to be likely intended, it compares the input sentence pattern to the typical sentence patterns, selects a most probable typical sentence pattern, displays the corresponding typical sentence, and asks whether the input sentence has generally the same meaning. If the user answers yes, it generates a pattern for the input sentence, adds the new pattern to its list of typical sentence patterns, and returns to the previous step.

To end up selecting a particular node, the input sentence pattern can be matched by any of a plurality of typical sentence patterns. When a match is found, a "cross reference record" is activated and, if it is satisfied, the node is selected. For most or all nodes, any of a plurality of cross reference records can cause the node to be selected. Consequently, once a node is selected, one of many cross reference records has been selected and, for the cross reference record, one of many typical sentence patterns has been selected. To permit a great diversity and richness of possible actions, actions may be attached to the typical sentence pattern and the cross reference record, as well as to the node, and all of the actions are executed when the node is selected. Consequently, if typical sentence pattern A leads to cross reference record C which leads to node N, the actions of typical sentence pattern A will be executed as well as the actions of cross reference record C and node N; and if typical sentence pattern B leads to cross reference record D which leads to node N, the actions of typical sentence pattern B will be executed as well as the actions of cross reference record D and node N.

In addition to being used to intentionally control a computer system, the invention may be used to look for anticipated meanings from any natural language source, even if the source is not intended to communicate with a machine or to control a computer or achieve a function. For example, it might be used for computer monitoring of a conversation between two people to look for anticipated intended meanings within their conversation. Many other equally disparate applications are possible.

BRIEF DESCRIPTION OF THE DRAWINGS

FIG. 1 shows the components of the knowledge base.

FIG. 2 shows the actions table and sample actions.

FIG. 3 shows the words table.

FIG. 4 shows typical hole attributes.

FIG. 5 shows the information stored for each sentence record.

FIG. 7 shows a table of textual responses.

FIG. 8 shows a table of node actions and responses.

FIG. 9 shows a table of object terms.

FIG. 10 shows a table of location terms.

FIG. 11 shows a table of cross reference records.

FIG. 12 shows the ATCVS Stack.

FIG. 13 shows the Action Stack which is the last field of FIG. 8.

FIG. 14 shows word numbers and categories before term rejection.

FIG. 15 shows word numbers and categories after term rejection.

FIG. 16 shows interim sentence candidate key patterns.

FIG. 17 shows final sentence candidate key patterns.

FIG. 18 shows the initial sentence waiting table.

FIG. 19 shows waiting based on terms.

FIG. 20 shows waiting based on cross reference validity.

FIG. 21 shows waiting based on number of holes.

FIG. 22 shows waiting based on categories.

FIG. 23 shows waiting based on depth of the ATCVS Stack.

FIG. 24 shows the completed initial sentence waiting table.

DETAILED DESCRIPTION

Glossary

Figure 6:
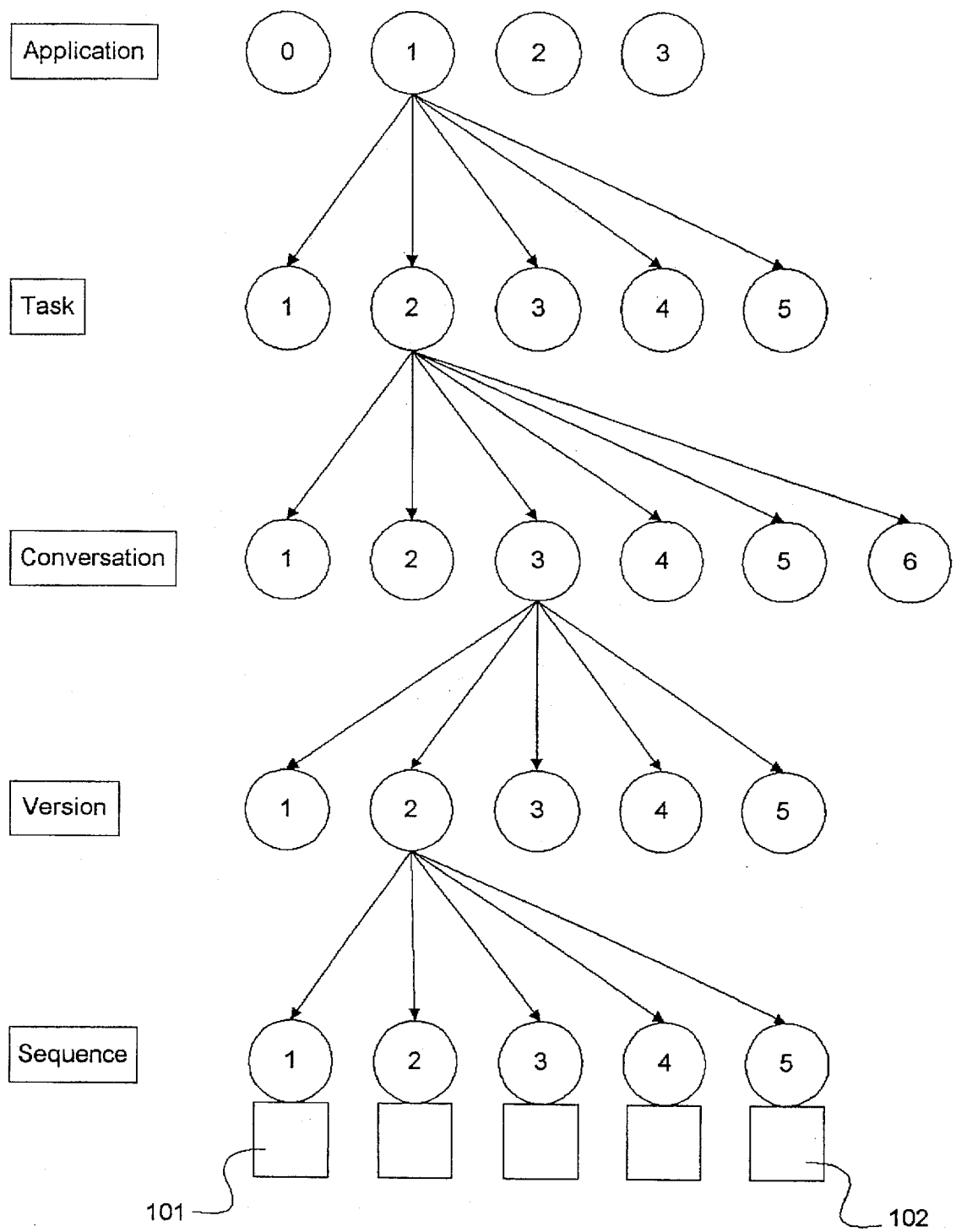
FIG. 6 shows the preferred method of organizing the general meaning nodes.
Figure 25:
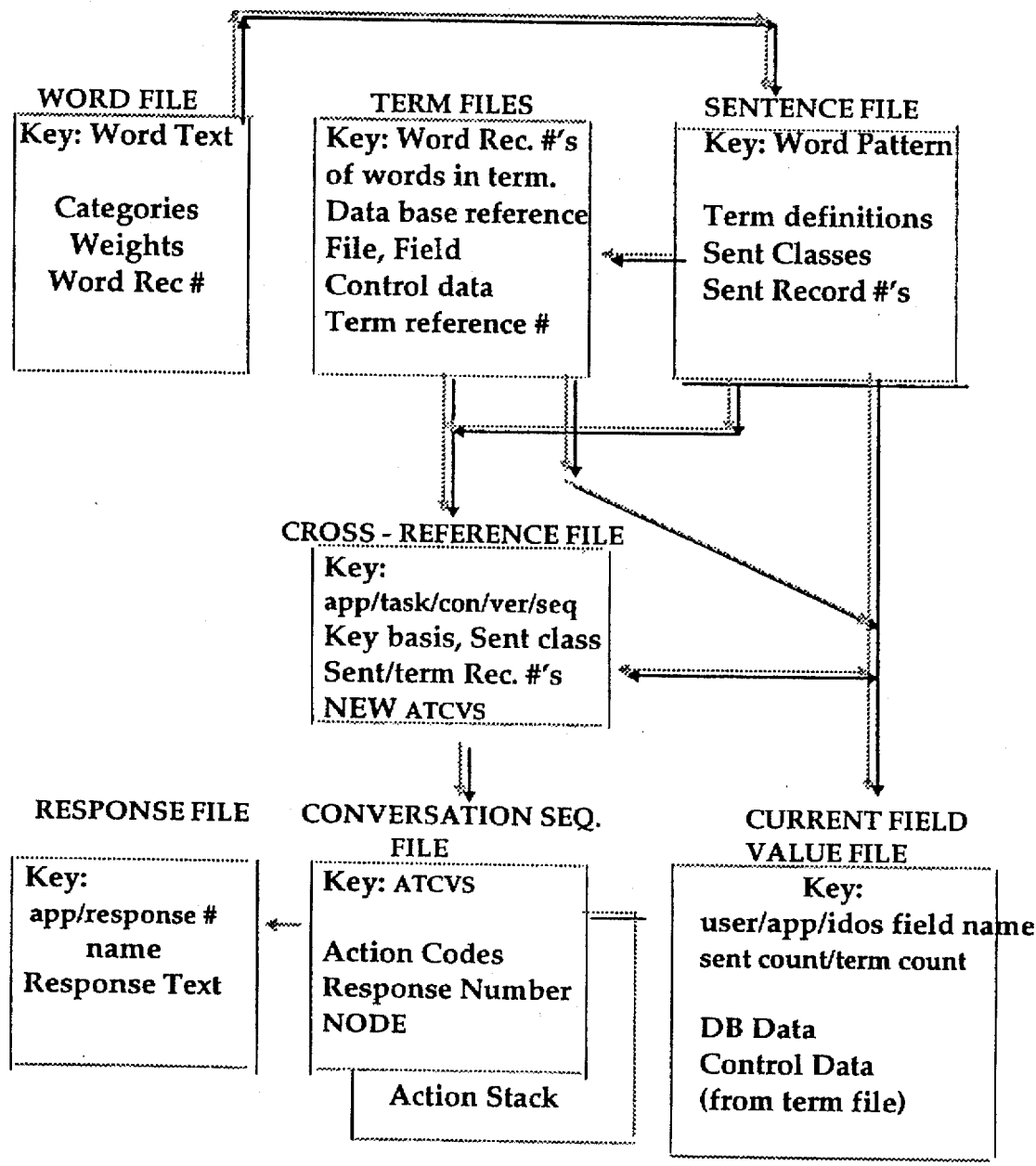
FIG. 25 shows the file structure relationships.
Figure 26:
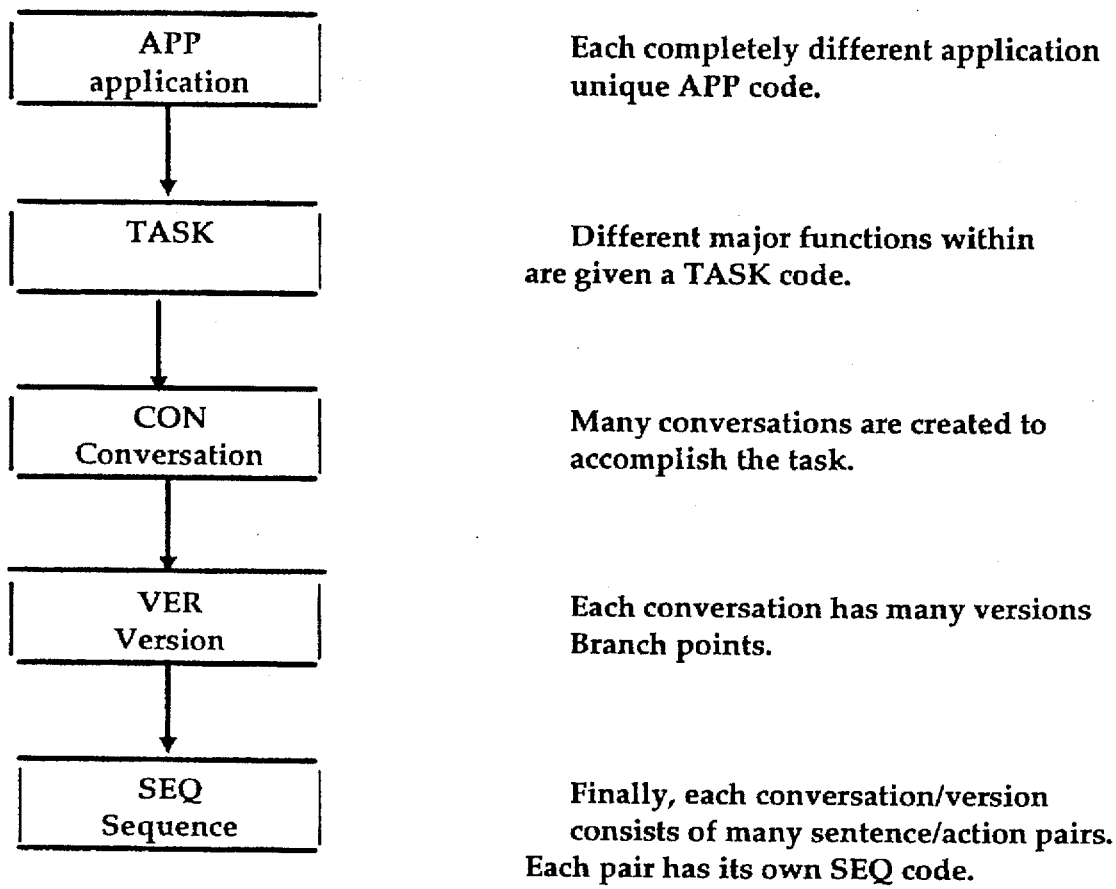
FIG. 26 shows the conversation structure.
Figure 27:
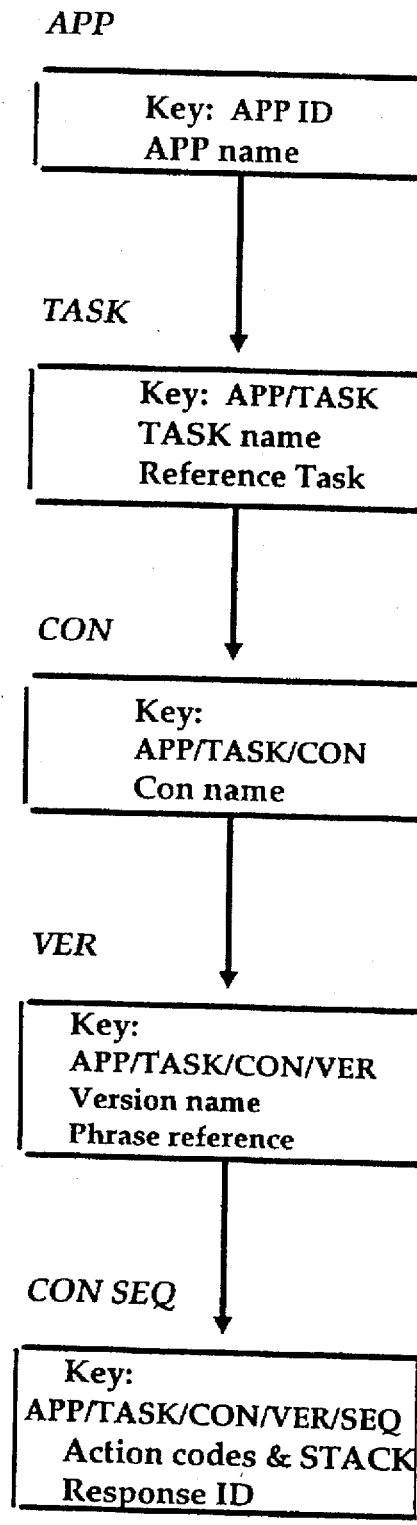
FIG. 27 shows the file layouts for the conversation structure.
Figure 28:
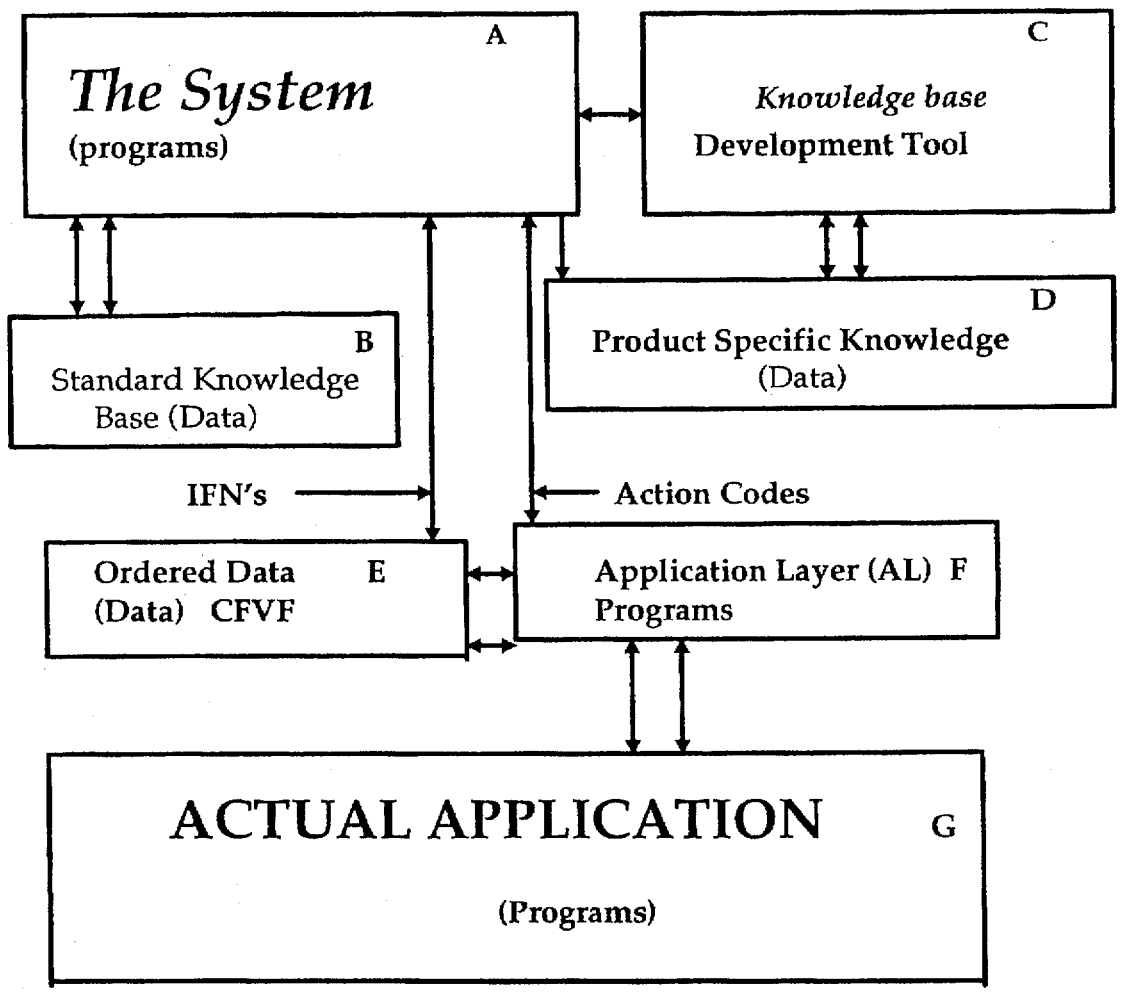
FIG. 28 shows the relationship between the system and the application.

"location terms" refers to any or all of node terms (sequence terms) and node group terms (conversation terms).

"jump phrase" refers to a conversation term (node group term).

"trigger phrase" refers to a sequence term (node term).

"term hole" refers to a hole with a category of object term or location term.

"key patterns" refers to typical sentence patterns or input sentence patterns, and, as each such pattern identifies a single sentence record, the term sentence record may be used to refer to typical sentence patterns.

"sequence", when it is not used to refer to the fifth number of a node reference number, is another term for node.

Before the system is ready for use by a user, "knowledge" must be built into the system by a knowledge engineer. As shown in FIG. 1, the thirteen components of knowledge that the knowledge engineer must place into a knowledge base are actions, sentences, sentence classes, words, word categories, hole attributes, sentence records, conversation organization, response, node actions, object terms, location terms, and cross reference records. The knowledge engineer may add increments to these components of the knowledge base in any order. Typically, as he is creating an increment for one component of the knowledge base, he will identify increments to add to other components and add them at the same time.

Actions

Each function that each of the underlying computer applications can perform must be designated as an action within the knowledge base. An action may cause the application to perform one or more defined functions. As shown in FIG. 2, each action is given a number, a specification of which application it controls, and a textual description. A typical application will have between 20 and 1000 actions. Application number 0 is the natural language interface itself. Textual responses presented to the user are considered a special kind of action and are entered separately as discussed below.

Sentences and Sentence Classes

Based on prediction or experience, the knowledge engineer must enter into the system typical sentences that he thinks a user is likely to enter, and he must organize them into classes. Sample sentences and sentence classes are shown in the Appendix. There should be one sentence class for each general concept that a user might attempt to express. Because the user will want the system to execute one of the possible actions, there will be a sentence class for each type of action for each application, as well as other sentence classes. Within each class, the knowledge engineer will draft a sentence for one or more typical ways that the user might express the concept. For example, in the Appendix, there are 13 ways that the user might express the concept "yes" and there are 7 ways the user might express the concept "no". The same sentence might appear in more than one class, if the same words might be used to express more than one general concept, the meaning depending upon context.

Words and Word Categories

As the knowledge engineer enters sentences into the knowledge base, each new word of each sentence is added to a list of words as shown in FIG. 3, which list may be referred to as a dictionary. As shown in FIG. 3, each word is given a unique number and the knowledge engineer enters cross references to synonyms and antonyms. Also, the categories in which the word may fall are listed. All of the words are specified as falling in the basic category, number 01. For those words which, in one of the applications, may be used to refer to a file, the word is given the category 04. For hose words which, in an application, may be used to refer to a field, the words is given the category 05. Each word that, in an application, is likely to constitute data or be a reference to a particular value that may occur in a particular field is given the category 14.

Typically there are between 5 and 15 category codes. The categories attempt to identify each of the different kinds of uses of each word that might be an object term or a location term. The category codes for a typical application are:

| 01 | Basic |
| 04 | File |
| 05 | Field |
| 11 | Date |
| 14 | Data |
| 15 | Conversation Term |
| 16 | Sequence Term |
| 18 | Modifier |

In addition to identifying likely uses of words in the dictionary, the category codes have other uses which are described later. The data code will not appear with any word of the dictionary, because it is not helpful for the dictionary to include every number that a user might enter to represent a data.

For each word, each category is given a weight value by the knowledge engineer. Although the knowledge engineer may establish default values, in practice it useful to indicate to the system whether the likelihood of this word using one category over another is high. Also, each word itself can be given an individual weight value. This is done, so that in conjunction with the category weight for that word, the word may receive a total weight relative to other words in a typical sentence (see FIG. 3).

When the knowledge engineer is entering sentences, if a word is not found in the system, the system asks whether the word is to be treated as data within the sentence. If so, it is not added to the dictionary. If the unrecognized word is not data, and the knowledge engineer confirms that the word is not misspelled, the system asks whether the word is an abbreviation or an alternate spelling and, if so, for what word. Each abbreviation or alternate spelling is added to the dictionary and a cross reference to the prior entry for the word is entered in the synonym field as shown in FIG. 3.

If the unrecognized word is not misspelled or data, it is placed in the dictionary with the category 01, basic. The knowledge engineer can add additional category codes to each word in the dictionary at any time.

Sentence Records

For each typical sentence entered by the knowledge engineer, the system builds a sentence record with the help of the knowledge engineer. To build the record, the system first displays to the knowledge engineer the text of the sentence. The knowledge engineer then identifies words which are used with a meaning that fits one of the defined word categories as that word is used in that particular sentence. For these words, the word number is replaced by the appropriate category code within brackets. The sentence is then represented internally by a string of word numbers and category codes in brackets, one number for each word. If two adjoining category codes in the string are the same, one of the two identical adjoining category codes in the string will be deleted. This results in a key pattern for the typical sentence which becomes the entry for the second field of the sentence record as shown in FIG. 5. Each category code in brackets is considered to be a "hole".

The third field of the sentence record, hole attributes, is explained below.

The action number that a user is likely to intend if it uses the sentence entered by the knowledge engineer is placed in the fifth field shown in FIG. 5. If the user would mean that two actions should be executed, both of the action number are placed in this field.

The sentence classes to which the sentence belongs, as shown in the Appendix, is placed in the last field of FIG. 5.

Hole Attributes

As explained above, the most significant words in each typical input sentence entered by the knowledge engineer are replaced by the codes of the categories which their meaning intends when that sentence is used. When each category code is selected by the knowledge engineer, the knowledge engineer knows more about the meaning of the original words than is represented by the category code. This additional knowledge is added to the system in the form of hole attributes. In a particular sentence, when a category code replaces a significant word, it is considered a hole. Typical attributes that further describe the hole when it is used in a particular sentence are listed in FIG. 4.

To complete each sentence record, for each hole or pattern of holes in the key pattern, the knowledge engineer may select a hole attribute to express additional knowledge regarding the significance of the hole in that particular sentence. In the hole attributes field of the sentence record, FIG. 5, sets of numbers are shown with semicolons as delimiters. In each set of numbers, the number or numbers preceding the hyphen represents the word order number of the hole, and the number following the hyphen represents the hole attribute number. For example, in the first record of FIG. 5, the second word is a hole of category code 05 and it has an attribute 01. The second and third words occurring together are each holes and, in this sentence, this combination of holes has hole attribute 05. The third word by itself is a hole of category 14 with a hole attribute of 02. The fourth word is also category 14, but with a hole attribute of 03.

Conversation Organization

The purpose for entering the sentences and building the sentence records is to create models for identifying the intended meanings that user might input in the course of a conversation with the system. The other side of the conversation is a response by the system consisting of textual or graphical or auditory output to the user on the screen. Each anticipated intended meaning and response by the system is called a "sequence-response pair" and is activated by the system selecting a general meaning node. All possible conversations are made up of strings of sequence-response pairs represented by nodes 101 and 102 in FIG. 6, of which there may be many thousands.

So that he can find his way in the system and the system can computer relationships between nodes, the knowledge engineer organizes the possible conversations. Typically, most of the sentences are entered by the knowledge engineer after he has designed the conversation organization. To give the knowledge engineer a useful structure for organizing the nodes, five levels, or dimensions, are used to specify each node: application, task, conversation, version, and sequence, as shown in FIG. 6. Each of these dimensions is given a number and, to make it easy to remember, a name. The first meaning that a knowledge engineer anticipates a user might intend might be designated application 0, task 1, conversation 1, version 1, and sequence 1. The node which is identified by application 1, task 2, conversation 3, version 2, sequence 1 is shown with reference numeral 101 in FIG. 6. The node which is identified by the string of numbers 1, 2, 3, 2, 5 is marked with reference numeral 102 in FIG. 6.

Responses

For each sequence created in the conversation organization, there is a textual or graphical or auditory response which is displayed on the screen or sent to another peripheral device. Each such possible response is entered by the knowledge engineer with a response number as shown in FIG. 7. Responses can have holes in them. If a hole is desired, the knowledge engineer enters the category code for the type of hole desired within brackets as shown in the bottom right field of FIG. 7.

Node Actions and Responses

For each node 101, 102 as shown in FIG. 6, the knowledge engineer must designate a response number as shown in FIG. 8, and may designate the action numbers for any actions that should be carried out when the node is selected. The knowledge engineer must also fill in the Action Stack information. This is shown in FIG. 13 and explained in the User Input Processing section below.

Object Terms

The knowledge engineer must specify words that are likely to be input by a user to refer to an entity or object within the system. These are referred to as object terms. The object might be a report, a file, a field, an action, a mathematical function, a peripheral device, an object as defined by object oriented programming, or any other specific entity that a user might wish to refer to. Within the system, the input words are identified by their word numbers in a string, as shown in FIG. 9. The input words may be a single word, or multiple words if they might be used to refer to an object within the system. Internal to the system, each object has a specific name, which is typically a cryptic identifier such as SP001 or VTCV.KB. This internal name is stored in a table with the numbers of the words which make up the object term and the object term number as shown in FIG. 9.

Location Terms

The knowledge engineer must also specify words that are likely to be input by a user to reference to a general conversation subject matter within the system. This is a "location" within the node structure shown in FIG. 6. When the knowledge engineer organizes the sequence-response pairs, all of the nodes which relate to a single subject matter are grouped under a single conversation and can be referred to with a three-number string referring to the application, task, and conversation as shown in FIG. 6. Like object terms, conversation terms may be a single word or multiple words. For each conversation term, the knowledge engineer specifies the application, task, and conversation numbers of the relevant node group as specified in FIG. 10.

Certain words likely to be input by a user may typically signal that the user intends a specific meaning and therefore a specific sequence or node location. However, depending on the context, and therefore the appropriate conversation, the same set of words might be used to refer to many different specific sequences. For these sequence terms (node terms), as shown in records 7, 8, and 9 of FIG. 10, the knowledge engineer merely identifies the relevant words or strings of words and gives each a number.

Most of the sequence terms are also object terms. For this reason, it is convenient in practice to merge the location terms table with the object terms table. The sequence terms which are not also object terms will not have an internal name as shown in the last three records of FIG. 10. This produces a single terms table with three different kinds of terms.

Cross Reference

To complete the knowledge base, the knowledge engineer must assemble a file of cross references which is used to determine the next sequence-response pair from recent user input plus the prior sequence-response pairs plus prior user input. To construct each cross reference record (see FIG. 11), the knowledge engineer takes the following items into consideration:

- purpose of the node to which the cross reference record points, (what general intended meaning should linked into from the cross reference record),
- under what conditions would that meaning be applicable, what object terms and/or locating terms (or plurality of terms) would assist in determining whether that general meaning is likely intended, and
- what other cross references exist to support the targeted node.

The knowledge engineer then constructs the cross reference record by filling in the following information for the cross reference:

- From what places will the cross reference be allows to fire? By filling in the Current ATCVS field with values that represent the "address" of a specific node, or by leaving some areas blank, the knowledge engineer tells the system from which node or node group the cross reference may execute.
- The New ATCVS field if the full address of the node that the cross reference will link to. This is filled out completely.
- The Sentence Class area of the cross reference record allows the knowledge engineer to indicate to the system what plurality of sentences, all of which carry the same generalized meaning, should be taken into consideration by the system as a possible valid sentence for this cross reference if other conditions are met.
- The Key Basis Type (KBT), of which the system presently uses five (5), is used by the knowledge engineer to tell the system which basis to use to fire this cross reference:

a unique sentence (KBT-2);

a class of sentences (KBT-1);

the value of an object or group term in conjunction with a class of sentence (KBT-3);

a class of sentences that contain holes categorized as some form of location term with other hole(s) that contain some combination of object or node terms. The key basis may be set to allow the system to find the most appropriate node in a conversation based on the values of all of the terms (KBT-4); and, use a class of sentences that contain holes which contain some form of group node term without an object term or a node term. This allows the system to pick the most likely node group and, from there, pick the most appropriate node based on context and history (KBT-5).

If KBT-1 is used, then the record number of the appropriate sentence is placed in the Sentence Number field.

If a KBT-3, 4 or 5 is used, the record number of a term used for this cross reference is placed in the Term Number field.

The Key Basis Type field is used to describe what combinations of information in the record is to be utilized to determine if the input sentence matches certain minimum criteria, and if does, how certain attributes of that sentence are to be used, as discussed in the User Input Processing section below.

User Input Processing

Creation of the knowledge base has been described above. Once the knowledge base is created, a user can enter a sentence at the keyboard and the system will respond appropriately. If the instructions from the user to the system are clear, the system will carry out the instructions. If they are not, the system will respond with a question. In any case, to process user input, the challenge is for the system to determine which of the general meaning nodes created by the knowledge engineer is intended by the user. This is a complex process which makes use of each of the eight sources of information which can be derived from a user input sentence as described above in the section entitled "Summary of the Invention". Many different algorithms could be employed to implement this processing. A neural network could be employed to match the eight sources of information to appropriate nodes. The preferred algorithm for processing user input is described below, beginning with a summary and continuing to a detailed explanation of each step.

Summary of Detailed Process Flow

1

Receive sentence from user input. Load text string into buffer in memory. Check for pattern of numerals and slashes which indicate a date is intended. If found, replace such word with date code <11>.

2

Look up each word in the word file. Replace each remaining word with the word number from dictionary. If a word is not found, assign data code <14>.

3

Using the word file, build table of all possible word numbers and categories (see FIG. 14). Use the word number instead of the category number whenever the category is "basic".

4

Process for Term identification and validity (FIG. 15). Do sentence candidate compression on the input sentence.

5

Create sentence candidate key patterns (FIG. 16).

6

Determine which sentence candidate key pattern to execute. Determine which sentence candidate key patterns match the typical sentence key patterns. Determine the possible meaning of the key patterns by abstracting the intended meaning of each, using sentence key patterns. Determine the possible meanings of the key patterns by abstracting the intended meaning of each, using the following tests.

1. Does the content of all holes meet the criteria of the hole attribute table? (This is a Pass of Fail test.)
2. Is there a cross reference currently, or in the past that would allow execution of a node, and does the sentence candidate meet all the criteria of that cross reference?
3. How many term holes are there in the sentence candidate?
4. What is the weight of the words relative to the hole category?
5. How far back in the past did the system have to go to find an executable cross reference?

7

Determine the typical sentence target that should be executed by choosing the sentence candidate that has the highest sum of all position values in the initial sentence weighting table.

8

Use the Cross Reference record that is linked to the typical sentence chosen, to fire the node that supports the general meaning of the input sentence.

Detailed Process Flow Explanations

Steps 1 through 3 need no further explanation.

Step 4

Term Identification and Validity Checking, and Sentence Candidate Compression using the Input Sentence As seen in FIG. 14, each word position is initially given every possible category for that word. Each category describes a type of term possibility for that word. The combination of all categories for a single sentence yields all possible key patterns for the input sentence. The number of possible patterns is the algebraic product of the total number of categories for each word. In common sentences, this value may be from only several to hundreds of thousands of patterns, depending on the complexity of the sentence and the richness of the categories.

Each of these patterns is referred to as a sentence candidate or input sentence key pattern. The most appropriate sentence candidate must be chosen by the system by abstracting the meaning of the input sentence and matching it with the anticipated meanings via a typical sentence.

However, in practice, there are a limited number of valid patterns. Many of the reference hole combinations are not valid; in other words, they are not on file, or they do not meet the criteria for that hole. By eliminating all but valid patterns, the number of sentence candidates may reduced (often by orders of magnitude).

Also, the system must determine the most likely combination of valid term word combinations if more than one term is used sequentially in the sentence For example, the input sentence may have been "add invoice number purchase order amount to the report". In this example, the below combinations, may all be valid terms. The system must determine what is the most likely meaning the user had in mind when the sentence was input:

invoice invoice number number
purchase
purchase order
purchase order amount
amount The most likely terms the user wants are:
invoice number
purchase order
amount The following steps occur to accomplish the above two objectives:

For each word, beginning with the first word, each category that relates to a term hole (such as file or field) is checked for validity. This is done by applying the following rule: Is the word, by itself (and NOT compressed or combined with other words) on file in the appropriate area; i.e. object term, node term or node group term areas (These three term files will be referred to as the term area when all or some must be checked in a system process). If the word is on file, then we assume that that particular word position may use the category being checked in the final list of sentence candidates. For our example, we will use category 04 as the one being checked.

The word position being processed shall be referred to as the current test word. The current test word, being on file in the term area, is stored in memory as a possible term.

If the current test word is not on file in the term area, the system will disregard category 04 as a valid hole for the current test word position, if that word is the only word that makes up a valid term. It is quite possible that the current test word cannot pass a test of the term area by itself, but can if the next word or words are taken into account. To make that determination, the system checks whether the current test word, combined with the next or further sequential words, that all have a category 04, make up one or more of file terms.

If the next sequential word contains the same category as is being processed in the current test word (04 in this example), then the two words combined are checked for on file condition in the term area. If the two words together are on file, then the combined words are stored in memory as a possible term. The system will allow the current test word in the sentence to be a category 04 hole using the combined words. This is done by not deleting the 04 categories from the table for each of the two words.

If, however, the next sequential word from the current test word either does not contain the same category as is being processed in the current test word, or it does, but can not pass a on file test in the term area, then that word is not to be considered a legitimate term. In this case the category being tested is deleted from the table for the current test word.

This reading of sequential words, anchored against the current test word, having category 04, will continue until a word fails the on file test, as a combined word term, or the word fails because it does not have the subject hole category listed in the table. Each time a sequential increment passes the on file test, the word from that increment is added as a possible term in memory.

If the last word in the sequence that was a category 04 failed the on file test as part of a string of words anchored against the current test word, it may still be a valid term word(s), and will be checked in the identical manner once the failure word becomes the current test word, and processing begins anew. When this occurs it simply means that there is a clear demarcation between terms that can pass the on file test. As stated previously in the section on sentence records, sequential hole categories of the same value are compressed into a single hole of that category in the key pattern for that sentence. Thus the sentences "add start date" and "add start date close date variance amount" are the same sentence with the key pattern "add <field>".

In this manner the system has not only chosen only valid terms, but has optimized the likelihood that the best combinations were chosen by taking only the longest combination of each term into account.

The previous steps have resulted in one (1) category hole 04, that has compressed one or more valid terms. Multiple word positions that have the same categories have been compressed into a single hole.

Still processing on the current test word, the system duplicates the above sequence for all other term categories listed in the table.

The process above occurs for every category in each word (see FIG. 15). After all hole compression of terms occurs and any deletions from the table happen, the process begins anew for the next word position in the table. That next word position becomes the current test word.

The result of term rejection and candidate compression is a table that only includes categories for word positions that are valid in regards to the term area (see FIG. 15). This verification of valid term categories eliminates all impossible sentence candidate key patterns relative to the system's object and location term knowledge base. A sentence candidate key pattern containing all words with a basic category is always included in this table.

Step 5

Create Sentence Candidate Key Patterns

Using the final table from the term rejection and candidate compression process (Step 4), the system builds a key pattern for every combination in that table. This key pattern, or sentence candidate (see FIG. 16) contains the basic words and the holes in the order input, but now processed for term validity, term probability and compression of holes.

Step 6

Determine Which Sentence Candidate Key Pattern to Execute

The first step is to determine which sentence candidate key patterns are valid relative to the system's typical sentence knowledge base. Since the system is using the literal pattern of the sentence as the key to the file, the lookups occur very quickly. A sequential lookup occurs from the sentence candidate key pattern table.

Any sentence candidate key pattern that does have an exact match within the sentence file, is deleted from the sentence candidate key pattern table (see FIG. 17). The typical sentences in the knowledge base that are under consideration for a match with the sentence candidates are known as sentence targets. These two items are described as the Sentence Candidate/Target pair of STCP.

Sentence Candidate to Sentence Target pair Testing

Now that the system has limited the sentence candidates to those that have an exact match to the sentence in the knowledge base, a determination must be made on which sentence candidate is the correct or best one. The following test must be made:

1. Does the content of all holes meet the criteria of the hole attribute table? (This is a Pass or Fail test).
2. Is there a cross reference currently, or in the past that would allow execution of a node, and does the sentence candidate meet all the criteria of that cross reference?
3. How many term holes are there in the sentence candidate?
4. What is the weight of the words relative to the hole category?
5. How far back in the past did the system have to go to find an executable cross reference?

The results of the above tests are stored in a weighting table known as the Initial Sentence Weighting Table (see FIG. 18).

Test 1

Does the content of all holes meet the criteria of the hole attribute table? (see FIG. 19)

If the content of holes does not meet the criteria of the hole attribute table, even though the sentence candidate/ target pair key patterns match exactly, this sentence could not meet the intended meaning of the user, and could not be matched to a node that anticipated a typical sentence.

The hole attribute table (see FIG. 4) describes and controls the content of holes in the sentence, including, but not limited to: declaring the specific object, node and node group terms, detail and usage; the physical location of those terms, including combining hole positions in the sentence to produce a single term; declaring control names for certain values within the holes (such as high range, low date, etc); and at times utilizing non-existent word positions to create null holes.

Each sentence target has a hole attribute table. If the sentence contains any holes that have information that must be passed to an application, that information will be contained within the hole attribute table. The hole attribute table will pass the specific details required for any term. The reference area contains fields which can describe the attributes of each term. For a field name within a data base, it is File Name, Field Name. The detailed description of the hole attribute table in the Sub-Process Descriptions section below discusses the methods used to accomplish the above.

In order to determine if the characteristics of the value of each hole contained in a sentence candidate match exactly that of the hole attribute table of the target sentence, the system will look up each value, for each hole, in the term area. If the hole attribute table declares that a hole is a field name, then the value when looked up in the term area must meet all the criteria of a field name. That criteria would be a non blank condition in the field name area of the term area record. The record location is determined by using the key pattern of the words that made up the content of the hole itself.

Examples of terms that are tested for non blank conditions are (see FIGS. 9 and 10):

| Object Terms | Term area |
|---|---|
| Field Name | Field Name |
| File Name | File Name |
| Data | Field Name & Control Value |
| Node Group Terms | App-Task-Con |
| Node Terms | Word(s) on file in term area |

If the content matches, then test 1 passed and position one of the initial sentence weighting table is not decremented, and test 2 will begin. If test 1 failed, the remainder of the tests are performed for analysis purposes, but the system will not allow this sentence to execute. With a failure, position one of the initial sentence weighting table is decremented for analysis purposes.

Test 2

Is there a cross reference currently, or in the past that would allow a execution of a node, and does the sentence candidate meet all the criteria of that cross reference? (See FIG. 20.)

If not cross reference exists for this sentence candidate/ target pair, then this sentence does not make sense contextually at this point in the conversation.

The cross reference controls context and allows a sentence to connect to and execute a node.

A cross reference can be associated with one or more typical sentences by: (1) the inherent meaning of the sentence (via sentence class codes); (2) specific values contained in holes within the sentence, either object terms, node terms, node group terms or any combination of the three; (3) the specific key pattern of any sentence; or (4) combinations of all the above.

The cross reference controls when certain sentences can cause a certain node to execute by not only the criteria above, which described the attributes and meaning of the sentence, but also by allowing the sentence to "fire" only if context conditions were met.

The cross reference also controls the linking of a sentence to a node by insuring that the sentence is in the correct placement in the conversation to allow a particular node to execute.

A sentence may well be able to link to more than one cross reference, but only one should meet all conditions of sentence meaning, content and position within the current conversation.

By testing both of these conditions the cross reference is controlling the context of the sentence, and thus allows the conversation to proceed within an appropriate and likely framework.

By cross reference checking, the system will be able to determine if one or more valid cross references exist for this sentence candidate/target pair. The detailed description of cross references in the Sub-Process Descriptions section below discusses the methods used to accomplish the above.

The testing is accomplished by the system processing the cross reference logic. If no cross reference could be found then test 2 has failed and position two of the initial sentence weighting table is decremented. If test 2 passes, by the system finding one or more possible cross references, position two of the initial sentence weighting table is not decremented (see FIG. 20)

Test 3

How many term holes are there in the sentence candidate?

The greater the number of valid terms in a candidate sentence, the more generalized and simultaneously precise is the sentence.

The test increments position three of the initial sentence weighting table by a value of two (2) for each hole in the candidate sentence. (See FIG. 21)

Test 4

What is the weight of the words relative to the hole category?

Each word has been assigned a unique weight value by the knowledge engineer. Each word contains one or more categories, designated by a unique code. Each category code for that specific word has a weight value assigned by the knowledge engineer. The weight for a specific category code may differ from word to word (see FIG. 3). This is done by the knowledge engineer in order to control the likelihood, in a hierarchical manner, that a specific word will have a particular meaning, in a typical sentence. Test 4 is done in order to measure and take advantage of that likelihood.

The value that is placed in position 4 of the initial sentence weighting table is derived from the following algorithm (also see FIG. 22):

Sum all weight values for all words used in all holes plus the sum of all weight values for category codes for those words. Divide that sum of words and category code weight values by the number of words that fill the holes in the candidate sentence.

Test 5

How far back in the past did the system have to go to find an executable cross reference?

As shown in FIG. 12, the system contains a file and processing subsystem known as the ATCVS stack, which stands for Application, Task, Conversation, Version, Sequence Stack. The ATCVS stack tracks past and current node sequences. During a conversation, each time a sentence, through a cross reference is able to "fire" a node sequence, the key pattern of that node sequence is placed in the stack if the task has changed. That key is the value of Application, Task, Conversation, Version and Sequence (see FIG. 6). The ATCVS value of the current node sequence informs the system of its placement in the conversation, which is the "System ATCVS".

One of the methods cross reference use to control sentence and node sequence "firing", and thus context, is the use of ATCVS. As shown in FIG. 11, each cross reference record contains a Current and New value area for ATCVS. The Current ATCVS of the cross reference record can be filled in completely or partially with an ATCVS key pattern by the knowledge engineer. The Current ATCVS acts as a filter to allow valid sentences to "fire" a new node sequence from certain "current" node sequences or node sequence groups.

If the key pattern value of the current node sequence is 1,3,100,400,10 (of Application=1, Task=3, Conversation= 1000, Version=400, Sequence=10) and the subject cross reference Current ATCVS is 1,3,1000,-,- (where "-" means blank), then this cross reference will "fire" the next valid sentence from any node sequence having the first three parts of the ATCVS value (1,3,1000).

The New ATCVS for the subject cross reference record is completely filled out by the knowledge engineer (no blanks) and contains the ATCVS key pattern that points to a specific node sequence, anywhere in the knowledge base. Usage of ATCVS in cross reference processing is further explained in the Sub-Process Descriptions section below, Detailed Description of Cross References.

Test 5 then, examines the ATCVS Stack, FIG. 12, in reference to potential cross references for this sentence candidate/target pair. The top position in the stack contains the current ATCVS.

First, using the current system ATCVS, the system determines if there are any valid cross references (see Test 2) that can, through their Current ATCVS area, be "fired". If so then position five of the initial sentence weighting table is not decremented, and this test is concluded.

If, however, from the current system ATCVS, no cross reference can be "fired" due to the values of the key pattern contained in their Current ATCVS area, then the system will use the ATCVS Stack to determine if past node sequence positions will allow a cross reference to "fire".

This is done by the system examining the next most recent position (n-1) in the ATCVS Stack (which will most likely have a different ATCVS key pattern value). Using the n-1 value of the ATCVS Stack the system will again see if any cross references exist that will allow "firing" of the sentence candidate/target pair being tested, by using the value of the cross reference's Current ATCVS field (see FIG. 21).

If not, the examination of the ATCVS stack is moved down the stack once more (n-2), and the same process occurs.

For each level past the current system level, the value of position five of the initial sentence weighting table is decremented by a negative five (-5) (see FIG. 23).

This process allows the system to determine if the input sentence makes sense relative to past parts of the conversation. For example, assume the user has generated a summary level report against specific data within a data base. While querying the system about specific values on the report, the user asks to see a list of fields that are contained in a specific file. That action caused the system ATCVS to change its value for C, V, and S. After examining the field list, the next sentence input by the user states that a column should be added to the report. That sentence my not be able to be fired because the current system ATCVS value does not match the filtering for the cross reference that would connect the input sentence to the node sequence, which contains the actions required to perform the meaning of the input sentence.

However, by moving down on the ATCVS stack, the system determines that there is a valid cross reference for the input sentence that also meets the Current ATCVS area criteria of that cross reference. Thus, a sudden shift in the flow of conversation, relative to the system's current node sequence, may be handled and executed.

In this implementation of the invention, it has been found that five (5) levels of downward movement on the ATCVS stack will handle most input situations and still maintain context and meaning integrity.

End of test for this sentence candidate/target pair.

Perform step 5 for each sentence candidate/pair in the Final Sentence Candidate Key Pattern Table (see FIG. 17).

Step 7

Choose the Sentence that has the highest sum of all position values in the initial sentence weighting table As each sentence candidate/target pair was tested in step 5; values for each test were placed in the appropriate position in the initial sentence weighting table, with one set of values for each. The system will "fire" the sentence/cross reference pair that has the highest total value (that also passed test 1). The results of that total can be seen in FIG. 24.

Step 8

Use the Cross Reference record that is linked to the typical sentence chosen, to fire the node that supports the general meaning of the input sentence.

The system, having matched an input sentence to a typical sentence, by that typical sentence, now has a cross reference which will point to a node that was generated by the knowledge engineer to anticipate a user's intended meaning.

As discussed in Test 2 of Step 6, and in the Sub-Process Descriptions section below, Cross Reference Details, the New ATCVS area of the cross reference contains the ATCVS key pattern, which is the address of the particular node that carries the general meaning and intent of the input sentence.

Before the node is fired, two other sub-processes occur. First, using the hole attribute table sub-processing, detailed information about each term is placed in what is called the Current Field Value Stack (CFVS) (See the Sub-Process Descriptions section below). There is one CFVS stack for each application. The CFVS is used to track the history of usage of all terms in the current conversation session and the functions to perform on those terms (such as Low Range or High Date). This information will used by the application to perform its functions. Certain action codes directly use the content of the CFVS.

The second sub-process to occur before "firing" the node, is the assembly of actions from the typical sentence chosen and the cross reference, if any exist for either or both. These actions, in the order of sentence and then cross reference, are placed in memory to be executed at the time of the node "firing", but before the node's actions are executed. By choosing to put action codes in sentences and cross references, the actions or algorithms taken by a node may be adjusted in the context of the previous node selected and the intended meaning of the input sentence, relative to the general meaning of the node itself. In practice, most actions are contained only within the node itself, but, under certain conditions, the knowledge engineer will choose to apply these adjustments.

Using the key pattern address contained in the New ATCVS area of the cross reference record, the node with that address will be executed.

As shown in FIG. 8, each node contains the following attributes: an action stack (see FIG. 13), an action code area, and a response number area (see also the Sub-Process Descriptions section below).

The action stack consists of a list of actions that can be adjusted or constrained, or passed certain parameters such as data values, report names, etc. The action stack, in effect, is a list of macros. This allows adjustment of a generalized meaning for the node, to handle specific parameters related to the intended meaning of the input sentence as well as to be influenced by history of terms used and the actions taken upon them, using the CFVS.

If the purpose of the node is simple, such as a screen dump to a printer, the node will most likely contain only one action code using the action code area, and not make use of the action stack. If the purpose is complex, the action stack may be used alone or in conjunction with the action code area. There is no fundamental difference between the actions codes contained in the action stack or action code area. FIG. 2 refers to both. But, the set of actions codes that can function in the action stack are larger than the set of action codes that can function in a sentence, cross reference or the action code area of the node itself.

The concept of actions also includes responses. Action codes can cause reports to be generated, devices to be turned on, etc. Under most conditions, the user is to be given a textual, graphical, or aural response that supports, explains, confirms or otherwise gives feedback to the user on the actions taken by the application. This is referred to as a response (see FIG. 7).

As shown in FIG. 8, the response number contained in the node is a reference to a specific record number in the response file shown in FIG. 7.

When the node is "fired", the following sequence takes place:

1. The ATCVS value for the node is copied to the system ATCVS and, if the A or T value has changed, it is pushed onto the ATCVS stack. This is now the current node.
2. Actions assembled from the sentence and cross reference record are executed by the application.
3. Actions from the action code area in the node are executed by the application.
4. The response is given to the user.

Deviations from Normal System Process Flow

The previous eight steps described the processing flow from a input sentence by the user to performing the intended meaning of that sentence via the actions performed by the typical sentence, the cross reference and the node. This included all appropriate functions on object terms, whether contained in an input sentence or defined in the CFVS from past sentences.

Three occurrences can cause a deviation in this flow. First if it is determined that, although there is a one to one correspondence between the key patterns of all sentence candidates and sentence targets, no cross reference can execute, then flow is broken. This would be due to the relationship of the current system ATCVS value and the filtering in the cross reference's Current ATCVS area. In this case, a system level response is generated indicating to the user that the input sentence cannot be executed in the present context. The system ATCVS value remains as it was before the input sentence was processed.

Second, if a word in the input sentence is not in the word file, it will cause a failure in key pattern matching. The system initially assumes the word must be data, and assigns the word position in the word number and category table the data category <14> (see FIG. 14). If no valid sentence candidate/target pair can be found because the word position in question cannot be matched in regards to either: (1) term intent via the hole attribute table sub-processor, or (2) no valid sentence key pattern could be found where a data category occupied that word position, then processing is interrupted and the user is asked for input such as "is this word misspelled". The value of the system's current ATCVS remains the same as before the sentence was input.

If the word was misspelled, then the user may correct it, and the process will begin anew as if this was a newly input sentence.

If the word was not misspelled then the user is asked such questions as whether it is data or a word that should be added to the permanent dictionary (word file). The system will then attempt to learn the meaning and intent of the input sentence.

The third type failure occurs when a new sentence is entered with all words on file, but in a unknown order. This will cause a failure of key pattern matching. The system will then attempt to learn the meaning and intent of the input sentence, as explained below. The second and third type of failure can occur simultaneously in a single input sentence.

Learn Mode

Upon a failure described above, the system would then process this essentially new sentence in a similar manner as in the process flow description, except that the process will attempt to abstract the meaning of this input sentence by comparing it to the typical sentences in the system. This done by:

1. Using the term verification logic described in Step 4.
2. Building a table of potential sentence candidate key patterns.
3. Matching for closeness in patterns (including synonyms, etc).
4. Building an interim hole attribute table for each sentence candidate which must be identically executable as the sentence target being processed (this is done by utilizing the hole attribute table from the target sentence as a guide).
5. Use various weighting criteria, including most of those in Tests 1 through 5 in Step 6 to determine which typical sentence(s) most closely meets the intended meaning of the input sentence.

The user is then queried if the selected typical sentence matches the intent of the input sentence. If the user answers yes, then the sentence candidate key pattern that most closely matched the typical sentence will be placed on file as a typical sentence, along with all actions, classes, and hole attributes.

---

SUB-PROCESS DESCRIPTIONS

HOLE PROCESSING
Sentence Key Construction:

| Write | a | jobs | list |
|---|---|---|---|
| Word 1 | 2 | 3 | 4 |

1. Basic; use word record number.
2. Basic; use word record number.
3. Category = 04 "File".
4. Basic; use word record number.

Key =

| 000101 | 000028 | FFFFFD | 000037 |
|---|---|---|---|

Where record number for Write = 000101
    a = 000028
    list = 000037
The "FFFFFD" is a 'HOLE'.
This time the word "jobs" fills the hole, but it could be any file name.
This way one sentence record can write a list for an unlimited number of files.

REPEATED HOLE COMPRESSION

| Write | a | Variance | History | List |
|---|---|---|---|---|

All words are "basic" except "Variance History"
These are category = 04.
The initial pattern is:

| 000101 | 000028 | FFFFFD | FFFFFD | 000037 |
|---|---|---|---|---|

The System sees 2 'holes' in a row with the same Category.
It will "compress" this into one hole.

| 000101 | 000028 | FFFFFD | 000037 |
|---|---|---|---|

Therefore, one sentence record can handle both single word file names and multi-word file names.

HOLE ATTRIBUTE TABLE CONSTRUCTION
Each sentence may contain term definitions.
Such as:
    INPUT SENTENCE:

| Write | a | Variance | History | List |
|---|---|---|---|---|

Sentence Key Pattern

| 000101 | 000028 | FFFFFD | 000037 |
|---|---|---|---|

Hole Attribute Table

| WORD POSITION | INTERVAL FIELD NAME |
|---|---|
| 1. 3, | File name |
| 2. | |
| 3. | |

In the above example, the "3," says to take the third word in the sentence key, make it into a term, and look it up in the object term file. Then store it in the current field value file as "file name".

"File name" is the System field name. The application layer will need to know the file name. The application layer will "write a list" using the current "file name".

The term will be expanded so that "Variance History" becomes the entire phrase. This is reversing the category compression effects (See step 4 of the processing flow).

TERM VERIFICATION AND REJECTION

1. Term rejection is a complex process which attempts to determine the validity of a particular sentence record, as applied to input sentence.
2. Because each word can have many category codes, there can be hundreds of possible sentence key patterns for any given target sentence.
3. For example:

Write a jobs list
    Categories for each word:

| Write ---> | 01 basic, 14 data |
|---|---|
| a ---------> | 01 basic, 14 data, 04 file, 05 field |
| jobs -----> | 01 basic, 04 file, 05 field |
| list ------> | 01 basic, 05 read, 14 data, 05 field |

Most words have a basic category by default. Then they can have many other categories, depending on how they are used. For instance "jobs" can be a file name or part of a field name, so the word "jobs" has a category 04 "file name". But the word 'jobs' can also be used as part of a field name, so jobs also has the category 05 "field name".

4. In the previous example the following conditions exist.

| word | number of categories |
|---|---|
| write | 2 |
| a | 4 |
| jobs | 3 |
| list | 4 |

To compute the total possible sentence key patterns we multiply each value as follows: 2×4×3×4=76 Therefore, 76 possible key patterns exist and must be tested.

5. Every possible valid key must be constructed and tested to see if that key pattern can be found in the typical sentence file. (The "key" to the sentence file is this key pattern.)
6. It is possible that several sentence records will be found during the search process. The System must determine which one is the best to use. This is done with a weighting table. But term rejection plays a dominant primary role in this process. (as well as others).
7. Each of the sentence candidates will be pre-processed to determine whether that particular candidate can be processed successfully if it is selected as the 'winner'.
8. For example, one test is to see if the terms can be constructed and loaded from the appropriate term area.
9. If the term records are not on file, then clearly, this sentence is not going to work with the current target sentence. This is the first level of term rejection. We say that the sentence has been rejected because of the failure to successfully load the term records that were defined by the candidate sentence. If a term record is loaded, it may still be rejected by other more subtle tests.
10. Data Base Matching. This technique looks at the term records and compares it to the holes used to build the term. Two category types are relevant for data base matching: 04=File name, and 05=Field name. If a term was constructed from type 04 holes, and a term is loaded, that term must have a non-blank DB file name. If the DB file name is blank, then clearly this term will not provide the needed information to the application layer. It may have simply been a coincidence that this sentence pattern caused a term to be loaded. The sentence must be rejected. The same is true for 05=Field name holes and the DB field name in the term record.

11. Data as a special case. Sometimes the term is not on file, but the term rejection logic accepts this as valid and does not reject the candidate sentence. This can happen with hole type 14 (Data). Data is information contained in the target sentence that might not be in the word file and shouldn't be, such as numbers or complex reference codes.

12. Sometimes the words of a data term will be on file but there will be no term record. This is a very special case and rules exist to govern The System's behavior.

Rule #1: If Cat=14 and term=only one word in length, and term is not on file, then; term is not rejected.

Rule #2. If Cat=14 and term=more than one word in length, and term is on file, then term is not rejected.

Rule #3. If Cat=14 and term=more than one word in length, and term is not on file, then term is rejected.

13. Term rejection logic is also used by learn mode.

CROSS REFERENCE PROCESSING (X-REF)

1. Once a sentence is selected, the context of the sentence must be determined. This is done by searching for an appropriate X-REF record in the XRCS file. This forms a chain linking a sentence to a node in order to form a conversation.
2. Any given sentence can be used in an unlimited number of situations. The sentence "Yes" for example, is used in hundreds of places within an entire knowledge base. What happens to the sentence is determined by the "context" of the sentence in relationship to the current conversation.
3. Knowledge Engineers are required to design conversations. To do this a data hierarchy model is needed. The chosen model is as follows:

| | |
|---|---|
| APP = | Application |
| TASK = | Major task of the application |
| CON = | Conversation |
| VER = | Version of the conversation |
| SEQ = | individual SEQ on sent/response item |

4. A great deal of thought is required to set-up this structure for any given application that The System is expected to interface with.
5. Many Conversations (CON) are designed to support a task (TASK) within a particular application or "APP".
6. Each conversation can have many versions (VER) or branch points which consist of individual sequences (SEQ) of sentence/response.
7. The value of ACTVS is the key to the CSEQ record, which is the node itself.
8. The XRCS file, however, is what actually controls during run time, in what direction the conversation is heading.
9. This is accomplished by using an elaborate key structure to the XRCS file. The key is as follows:

| |
|---|
| APP |
| TASK |
| CON |
| VER |
| SEQ |
| Key Basis |
| Sent Class |
| Record Number |

10. Many attempts are made to find an XRCS record. As soon as one is found it is fired.
11. The attempts to find an XRCS record are choreographed in a precise way.
12. Several concepts help explain this process:
   a. the ATCVS
   b. 5 key basis types
   c. sentence classes
   d. jump phrase(s)—which are the node group terms
   e. reference phrase(s)—which is an object term, or node term
   f. trigger phrase(s)—which is a node term
   g. reference task
13. The current ATCVS. This is maintained by The System in a stack called the ATCVS stack. The System "remembers" its place in up to 5 conversations simultaneously. This is analogous to when people are talking about one thing and they switch to another topic, then come back to the original topic right where they left off.
14. The most basic way to advance the conversation is increment the SEQ by 1 and try to load a XRCS record. This would take us to the next "step" in the pre-defined conversation—in practice, however, it's not so simple.
15. The "last" XRCS record will have loaded a CSEQ record which loads a set of actions and responses and executes it. The "last" XRCS record also 'sets' the current ATCVS. (APP/TASK/CON/VER/SEQ). The users types the next sentence and the last XRCS new ATCVS is used as a key to load the next XRCS record.
16. This allows a user to branch the conversation in any direction at any time. The KE must anticipate the meaning of nodes and have XRCS, CSEQ, and response records already on file.
17. Filtering. The early attempts to load XRCS is with "heavy" filtering. This means that the current area (APP/TASK/CON/VER/SEQ) are filled in with relevant values. The values come from what is called the current "ATCVS". A heavily filtered XRCS record is highly specific to this exact location in the conversation. Some XRCS records have portions of the ATCVS blanked out. Such a "lightly" filtered XRCS record has a broader scope of action.

The XRCS loading logic first tries to find heavily filtered records and works its way up towards lighter filtering. The Knowledge Engineer has to carefully decide how to use this feature. For example, in the course of a conversation a response is generated which asks the user a yes/no type question. A yes answer branches the conversation one way; a no answer, the other way.

Since many other places in the conversation may also have a yes/no branch point, the filtering must be very heavy, with all parts of the ATCVS filled in. This makes this XRCS record totally specific to this one place in the conversation, and a highly specific response will probably be displayed.

By leaving the SEQ blank in the XRCS key, the XRCS record has broader scope. It may be applicable at more than one point in the conversation. Each part of the ATCVS, in turn, can be left blank to further broaden the scope of the XRCS record. (Except for APP, which must never be left blank.)

In a conversation to write reports, the user might say "add buyer name to this report". This sentence could occur at any point in the conversation. A lightly filtered XRCS will link this sentence and fire off the correct CSEQ record. In the previous example, sent class="add field" will link the sentence to the XRCS record using key basis type="1". (See below.)

The APP and TASK would have been filled in, the CON/VER/SEQ would be blank, making this a mildly filtered XRCS record.

Start of conversation (SOC). This is a XRCS record where APP is filled in (as always) but TASK/CON/VER/SEQ are all blank. This is the most lightly filtered record possible. Some sentences are used to start off a conversation with the system. You can say them anywhere in any conversation and they will be recognized as a start of a new conversation instead of a continuation of the current conversation. The current conversation will be "pushed" down the ATCVS stack, making it possible to "pick up" right where you left off. Any sentence used as SOC has a APP field which can modify the current APP. In this way The System can switch from one application to another with relative ease.

The System makes six (6) specific load attempts relative to filtering:

```
Source:
1. Current APP/TASK/CON/VER/SEQ (from last XRCS' new) heavy
   filtering
2. Current APP/TASK/CON/VER/----    (---- are blanks.)
3. Current APP/TASK/CON/ ----/----   mild filtering
4. Current APP/TASK/----/----/----   light filtering
5. Current APP/----/----/----/----
6. Sentence APP/----/----/----/----  This is the APP from the
                                     sent record which might
                                     be different from the
                                     current APP.)
```

Filtering does not operate in an independent way. It is integrated with all the other parts of the XRCS key as described below:

18. The five (5) key basis types:

1=use sent class

2=use sent record number

3=use sent class with term record number; node or object term

4=jump phrase—node group term with an additional object or node term

5=jump phrase=5–node or group term

1. Use Sent Class—Each sentence record is assigned a sent class by the Knowledge Engineer. In fact, sentences can have multiple sent classes. For example, the sentence "yes" has a Sent Class 001=yes. The sentence "yes please" also has a Sent Class 001=yes. Therefore, a single XRCS record tied to a Sent Class can be "linked" to many sentences that have roughly the same meaning, by creating a sentence class that represents that meaning. Since a sentence can have multiple sentence classes, each one will be tried out for a given sentence. Also, the six levels of filtering mean that these attempts to load a XRCS record will be repeated for each of the six filtering levels.

2. Use sent REC number. Each sentence record is assigned a unique record number as an alternate key. A sentence can link directly to a XRCS record using key basis=2. This might be done in a case where the sentence does not fit into one of the standard sentence classes. It is a unique situation requiring a "hard code" technique. Using a sentence class (as described above) would be considered a "generalized" approach.

3. Use sent class with a trigger phrase record number. Trigger phrases are typically node terms, but can be object terms. Every term in the term area has a unique record number, similar to the Sent REC number described above. Sometimes the direction of the conversation needs to vary depending on the actual term that was used. A sent class must be used in this case. An example would be:

"Tell me what <hole> means?"

(The hole would be filled with many possible terms. Each term may need its own unique response for this example:

1. Tell me what start data means?
       2. Tell me what close data means?

We have two trigger phrases; "start date" and "close date". We must link to a different XRCS for each term so that a different response will be generated. The trigger term record number will be stored in the xrcs file in the "record number" field. The key basis will=3 and sent class will be set to the appropriate value. These 3 fields, along with the ATCVS will make the key to XRCS. Each new term linked to this sentence will have a separate XRCS record dedicated to it.

4. Jump Phrase. Node group term with an object or node term. The jump phrase is another generalized way to use the same sentence record over and over to do different things. The jump phrase contains information that allows The System to "jump" to a completely new place in a conversation, or to a new conversation. The term file contains the fields APP/TASK/CON. These fields when used, provide the "address" of where to jump to when a jump phrase is used. Any term can be a jump phrase by simply having non-blank values in these 3 fields. The XRCS searching logic detects the fact that the target sentence has a jump phrase in it. The system then looks for an appropriate XRCS record to re-direct the conversation.

For key basis=4, one more requirement must be met. The target sentence must also have a trigger phrase. The trigger phrase record number will be inserted into the XRCS record number field very much like in key basis=3. Also, all of the sent classes will be tried, finally the blank sent classes will be tried. (i.e. multiple load attempts to see what can be found.)

For example: "I want to see projected profit for all projects".

"Projected profit" is the jump phrase.

"Projects" is the trigger phrase.

The projected profits term will cause a APP/TASK/CON to be "pushed" onto the ATCVS stack. The system will try to load a XRCS record using the top entry of the ATCVS stack. The new top entry will have the VER and SEQ blank, because a jump phrase is "mildly filtered". The XRCS loading logic detects that the SEQ is blank and skips that level of load attempts, the same with VER. On CON, it tries key basis=4 with the trigger phrase record number (projects). This loads a XRCS record where the "new" ATCVS is "fired". In this example a report is printed at the project level.

We might also say:

"I want to see projected profit for all companies."

This would use the same jump phrase but the trigger phrase takes us to a different place. Companies requires a higher level report to be generated.

This feature allows for a highly generalized way to move around inside of conversations or jump to other conversations, the Knowledge Engineer is required to design the proper structure of jump phrases and trigger phrases in conjunction with some specific sets of actions relating to the given application. One can imagine a highly structured conversation that proceeds along a primary path, however, jump/trigger phrases allow users to move easily or jump into the structure anywhere, anytime. It is said that the conversation has many "entry points".

5. Key Basis=5

Jump phrase with no trigger phrase. This represents a way of firing an XRCS record in a start of conversation mode. All sent classes will be tried including the blank sent class. This is the last key basis type processed. An example follows:

"Show me projected profit."

Since there is no trigger phrase to specify the level to jump to, the Knowledge Engineer must decide where this will go—usually it would be the highest level of the conversation or SOC.

19. Sentence Classes

Each sentence has one or more sent classes assigned to it. These classes usually indicate some kind of action that the sentence will initiate within the application. For example, consider the following classes:

001=Write Report

002=Add Field to Report

003=Delete Field from Report

004=Subhead on Field

Many sentences will exist that are instructions to perform these functions. For instance:

"Add start date to this report."

"Can you include start date in this report?"

"I want start date as a column on the report."

In each example start date is a term, and the actual sentences have a cat=05 (five) hole in place of start date (so that any field could be used). Also, all three of these example sentences are sent class=002 (Add Field to Report).

Sentences must somehow get linked up to a XRCS record. In this example we could use a key basis=2 and create 3 separate XRCS records, one for each sentence. This would be clumsy, however. It would make the xrcs file very large and hard to maintain. Good Knowledge Engineering requires careful thought on how to build the Knowledge base. This example can be done more efficiently using a key basis=1 and creating only one xrcs record using sent class=002.

This one XRCS record is used for all sentences that are sent class=002.

A sentence can have up to 5 separate classes. This allows a sentence to be tested in more than one way.

20. Jump Phrase=Node Group Term

Jumps to a new place in conversation or a new conversation. See key basis=4 for more information.

21. Trigger Phrase=Object Term or Node Term

Controls direction of conversation, or in some cases, controls the level of entry into a conversation.

Type 1 Direction of conversation

See key basis 3 for examples.

Type 2 level of conversation.

Conversation can be designed to have levels to them. These levels might reflect some hierarchy inherent within the application. For example, imagine an accounting system with the following hierarchy:

1. Company

2. Division

3. Project

4. Job

Each of these levels might have a conversation or series of conversations that extract information from the accounting system and summarize it at the given level. For example:

"I want to see variances by project."

The word project is a trigger phrase, variances is a jump phrase (see key basis=4). Information about variances to the budges stored in the accounting system is available at any level of summary of detail. In this example we want the variance information summarized at a project level.

A trigger phrase is defined in the hole attribute table for the subject sentence.

23. Reference Phrases

This is a Knowledge Engineer supplied trigger phrase. Reference phrases are stored in the VER file and are specific to the conversation being designed. They follow the hierarchy of the conversation or application.

The reference phrase is an object or node term. A field in the VER file contains the reference phrase. When leaving a node, if the ver for that node contains a reference phrase, the value will be stored in memory. If subsequent input sentences cause XRCS record KBT-5 to fire, and the APP/TASK/CON/VER for the new node record whose reference phrase contents match that of what is in memory, then the node pointed to by the xrcs KBT-5 will be overridden and the new node will be the one with the identical reference field.

24. XRCS Processing (Final Summary)

XRCS processing can be thought of as a highly structured series of record load attempts. A key is constructed to the xrcs file. An attempt is made to load a record. If a record is found, it is "fired". If no record is found, processing continues. The order in which the record load attempts occur is critical, and has the following basic structure:

A. ATCVS Stack levels

B. ATCVS Filtering

C. Key Basis Processing

This is a loop within a loop, within a loop. Each loop will be considered in detail.

A. The outer loop considers the ATCVS stack, 1st the top level of the stack is processed. This would be the current conversation in process. Then the next most recent conversation will be considered. Conversations are pushed onto the ATCVS stack whenever the task changes. On APP, we consider this to be a major change of topic. By pushing the old topic on the ATCVS stack, we allow ourselves to come back to where we were. 5 levels of ATCVS stack are checked.

B. ATCVS Filtering. This consists of six iterations, where each try lightens the filtering. See item #17 for example.

C. Key Basis Processing proceeds as follows:

Key Basis=4 is first (only if current sentence has a jump phrase in it.)

First check for trigger phrase.

If none, try reference phrase.

All sent classes are checked.

A blank sent class is checked.

Key Basis=3 (all sent classes).

Key Basis=1 (all sent classes).

Key Basis=2

Key Basis=5 (all sent classes plus blank class).

RESPONSE GENERATION

The System contains a Master Response File. Knowledge Engineers (KE) are required to pre-build the responses for whatever the user might typically say. Responses consist mostly of text simply typed in by the KE, but responses can be generalized to some extent, as well.

Responses can have "holes" in them. These holes should refer to variable data. The holes will be filled in by the system at run time. Holes can be filled by two types of data:

1. Data from system internal field names.
2. Data from the application.

For example: user says: "I want a jobs list".

The system processes "jobs" as a hole and stores it in the internal field name="File Name".

Response: (as created by KE)

"The following list is from the <File Name> file."

Response: (as generated by the system for this example)

"The following list is from the Jobs File".

The system has inserted the term "jobs" into the hole, making the response more generalized and yet specific.

Another type of response action is possible. Using the @ symbol it is possible to create an interface to the application layer. The syntax is as follows:

<@ .... >

This construct would be imbedded within the response text. The application would define what verbs would exist and these verbs would go after the @ symbol.

The system will call a special application layer interface to allow the application to "fill in" the hole.

This method allows the application to customize responses to provide words with any kind of information as required.

APPLICATION INTERFACE

The system processes sentences, displays responses and passes information to the application layer (AL). The AL performs any functions or actions required based on the conversation in process. Two primary kinds of information is passed to the AL:

Control Data

Context Data

Control data takes the form of what is called "Action Codes". Action codes are two characters such as: 01, 02, 03, etc.

Each code has a fixed and specific action that is invoked at the AL whenever that code is referenced. Action codes are always related to something the user just said. Something that acts as a request for the computer to take some action. Examples are:

01 Write report

02 Add field to report

03 Delete field from report

The AL has to know how to perform the action. The AL controls the actual application. Examples of applications are:

Data Base Systems

Word Processors

Accounting Applications

Report Writers

Spreadsheets

The AL will, in may cases, require additional data from the user in order to perform the action, this is "context data". This data is organized using "INTERNAL FIELD NAMES" (IFN). IFN's are created by the KE and are always application specific. IFN's are names for different kinds of context data that the AL is going to need. Examples are:

| File Name | Field Name |
|-----------|------------|
| Low Range | High Range |
| User Name | Report Name |

These examples are from a report writer application. If the user wants to write a report (action code 01) then the AL needs to know what "File Name" (IFN) to base the report on.

APPLICATION LAYER

If the user wants to add a field to the report format (action code 02) the AL needs to know what "Field Name" to add.

This information is read from the current field value file (CFVF) by the application. The system will write information into CFVF as it is processing a conversation. CFVF acts as a short term memory for the system.

What file are we currently working on?

What file were we working on a few minutes ago?

What field needs to be added?

Action codes are very specific to the exact place we are in the conversation. They are stored in CSEQ. Context data, however, has a broad range of effect. The AL will read the CFVF file looking for what it needs. The information it needs may have been stored in CFVF many sentences in the past, or it may just have been created in the current sentence, or some combination of the two.

Data for CFVF records comes from the term file. As each sentence is processed, the system compiles terms from the hole attribute table stored in the sentence record. Associated with each hole attribute is an internal field name.

For example:

| "I want a vendor transaction list" "I want a <file> list" | :input sentence :sentence pattern key |
|---|---|
| 1. 4, File Name<br>2.<br>3.<br>4. | :hole attribute |

The first column specifies what words make up the term. 4 means the 4the word in the sentence pattern. The comma is required at the end of the entry. Many words can be combined to make a term. Any order is possible. 4, in this case, points to a "hole" not an actual word. This is the normal case.

The 2nd column is the internal field name (IFN). The data will be stored in the CFVF file using the IFN=file name. The IFN is a very important part of the key to the CFVF file. In this case the object term "vendor transaction" will be looked up in the term files. The object term record will indicate a DB File="APTX".

APTX will be stored in the CFVF file under IFN="file name". The action code will be "01". The AL will read CFVF looking for the IFN=file name. It will find it, and use APTX as the file name to write a report with.

THE CFVF STACK

Information in CFVF is said to be "stacked". This is a result of the last two fields in the key:

Sentence count term repetition count

Sentence count. This is a sequential number upcounted by the system for each sentence/response event. It starts at 1 each time a user session is initiated. All CFVF information is erased at the start of a session. The AL layer can read this stack from the most current sentence backwards in time. The same IFN might have been stored in CFVF several times. By reading backwards it is possible to know what was happening earlier in the conversation. For example:

| User says: | 1. "I want a jobs list" :AL writes job list |
|---|---|
| | 2. "I want a vendor list :AL writes vendor list |
| | 3. "What was that file we were working on before?" |

The AL will read CFVF for the IFN=file name. The first thing it finds is "vendor" from sent count=2. The AL goes back once more and finds "jobs" at sent count=1.

The IFN repetition count

The same IFN can appear in a single sentence more than once. Each occurrence causes the phrase repetition count to go up by one.

Example

"Please add close date and date sold to this report."
"Please add <FIELD NAME> and <FIELD NAME> to this report."
Hole Attribute Table

| 3, | Field Name |
|---|---|
| 5, | Field Name |

The IFN field name is repeated twice in the same sentence, therefore, the sentence count will be the same for both occurrences. We need another way to store the two separate entities. IFN repetition count does this for us.

APPENDIX 1 - Sample sentences and sentence classes

Class: 001 Yes
000000000011  yes
000000000416  ok
000000000428  yo
000000001390  please
000000001392  do it
000000001444  y
000000001712  yep
000000001713  yea
000000001717  affirmative
000000001717  you bet
000000001719  go ahead
000000001722  you better believe it
000000001723  okey dokey Class: 002 No
000000001279  n
000000001434  no
000000001714  nope
000000001715  nada
000000001716  negative
000000001720  no way
000000001721  no way jose Class: 003 Identification of user name
000000000002  <Proper Noun>
000000000005  my name is <Proper Noun>
000000000303  hello i am chuck what can you do Class: 004 General Conversation
000000000003  i am ok
000000000004  i am fine how are you
000000000006  no so good
000000000008  hello APPENDIX 1 - Sample sentences and sentence classes -continued 000000000014  fine how are you
000000000424  fine
000000000497  you tell me
000000000499  i dont know
000000000500  what questions can you answer
000000000660  well perhaps you could tell me
000000000743  ok how about yourself
000000000766  what do you want
000000000767  what can i do for you
000000000768  what is it you want
000000000769  no what is it i can do for you
000000000770  you first
000000000788  so Class: 005 DELETE a field from a report
000000000018  delete <Field>
000000000025  go ahead and delete the <Field>
000000000048  get rid of <Field>
000000000049  please get rid of <Field>
000000000060  i dont want <Field> on this report
000000000061  i dont want <Field> in this report
000000000064  delete <Field> then delete <Field>
000000000072  delete <Field> and delete <Field>
000000000077  delete <Field> and then delete <Field>
000000000083  delete <Field> and then please delete <Field>
000000000084  delete <Field> and then delete the field <Field>
000000000085  delete the field <Field>

Class: 006 ADDING a field to a report
000000000017  add <Field> and <Field>
000000000023  add <Field> and <Field> to the report
000000000024  yes add <Field>
000000000035  please add <Field>
000000000068  can you add <Field> also
000000000070  i need <Field> also
000000000075  extend with <Field>
000000000086  please include <Field>
000000000090  include <Field>
000000000096  please add the <Field>
000000000158  insert <Field>
000000000169  can you add <Field> and then add <Field>
000000000201  can you add <Field> to the report
000000000207  please add <Field> to the report
000000000233  just add <File> <Field>

Class: 007 HI/LOW range check
00000000000L  what has <Field> since <Date>
000000000022  only show <Field> from <Data> to <Data>
000000000031  only <Field> from <Data> to <Data>
000000000034  please <Read> only <Field> from <Data> to <Data>
000000000047  i want to see <Field> from <Data> to <Data>
000000000208  show only <Field> from <Data> to <Data>
000000000269  i only want to see <Field> from <Data> to <Data>
000000000283  just print <Field> from <Data> to <Data>
000000000802  just show me <Field> from <Data> to <Data>
000000000861  i only want to see <Field> <Data> thru <Data>
000000000988  show me <Data> thru <Data>
000000000990  show me the <Data> thru <Data>
000000000991  show me <Data> to <Data>
000000000992  show <Data> thru <Data>
000000001002  only show <Data> thru <Data>

Class: 016 Generate a BASIC REPORT format
00000000000L  base it with the <File> file
000000000016  <Read> <File> file
000000000029  show me the <File> file
000000000037  please give me a <File> file <Read>
000000000038  i want a <File> file <Read>
000000000040  i want a <File> <Read>
000000000041  i need a <File> <Read>
000000000045  please give me a <File> <Read>
000000000050  please <Read> the <File> file
000000000054  <Read> the <File> file
000000000062  <Read> the <File> file please
000000000081  <Read> <File>

Class: 019 Sentence is TOO VAGUE, has many uses
00000000000L  write
000000000231  what is it used for
000000000394  what can this system do for me
000000000395  what sort of reports can be written
000000000404  what fields are in the data base
000000000405  lets write a report

| | APPENDIX 1 - Sample sentences and sentence classes |
|---|---|
| 000000000422 | i need to write a report this morning |
| 000000000425 | write a report |
| 000000000426 | need a report |
| 000000000427 | need report |
| 000000000429 | i want a report |
| 000000000430 | write a report for me |
| 000000000431 | do a report for me |
| 000000000432 | give a me a report |
| 000000000433 | i need a report |
| 000000000434 | i need a report written |
| 000000000435 | i need a written report |
| 000000000466 | what kind of reports can you handle |
| | Class: 026 Jump phrase & multiple selects |
| 000000001568 | <Jump Phrase> for <Field> <Data> <Field> <Data> please |
| 000000001604 | <Jump Phrase> for all <Data> <Field> <Data> |
| 000000001605 | <Jump Phrase> for <Data> <Field> <Data> |
| 000000001606 | what is the status of <Jump Phrase> for <Field> <Data> <Field> |
| 000000001610 | <Jump Phrase> for <Field> <Data> <Field> <Data> |
| 000000001611 | what is the status of <Jump Phrase> for <Data> <Field> <Data> |
| 000000001612 | <Jump Phrase> for all <Field> <Data> <Fiel> <Data> |
| 000000001624 | <Jump Phrase> for <File> <Data> <Field> <Data> thru <Field> <Da |
| 000000001626 | what are <Data> <Jump Phrase> for <Field> <Data> |
| 000000001627 | show me <Field> <Data> <Jump Phrase> for <Field> <Data> |
| 000000001693 | status for <Field> <Data> for <Field> <Data> early <Jump Phrase |
| 000000001800 | <Jump Phrase> for <File> <Data> for <Data> |
| | Class: 042 Go BACK one level in Conversation |
| 00000000000L | return to the previous report |
| 000000001270 | go back |
| 000000001317 | go back up please |
| 000000001324 | i need to go back |
| 000000001325 | go back one |
| 000000001326 | go back to the previous conversation |
| 000000001327 | i need to return to the previous conversation |
| 000000001328 | please go back to where we were |
| 000000001329 | what was it we were doing |
| 000000001330 | return to our conversation please |
| 000000001331 | return to where we were in the conversation |
| 000000001332 | return to where we were |
| 000000001334 | go back to where we were in the first place |
| 000000001335 | what was it we were doing before |
| 000000001336 | what was it we were doing NOF: 001236 |
| 000000001337 | would you return to where we were please |
| 000000001343 | return |
| | Class: 050 Jump Phrase Super Class |
| 00000000000L | what is the <Jump Phrase> status for <File> <Data> |
| 000000001127 | what are the <Jump Phrase> figures |
| 000000001131 | what is the status of <Jump Phrase> status |
| 000000001138 | what is the <Jump Phrase> |
| 000000001141 | i need to know the <Jump Phrase> status please |
| 000000001142 | i need to know the <Jump Phrase> status for all <File> please |
| 000000001143 | what is the <Jump Phrase> for all <File> |
| 000000001145 | what is the <Jump Phrase> status of all <File> |
| 000000001146 | what is the status of all <Jump Phrase> |
| 000000001149 | what are the <Jump Phrase> for all <File> |
| 000000001150 | what is the status of <Jump Phrase> for all <File> |
| 000000001151 | what <Jump Phrase> has been <Jump Phrase> for all <File> |
| 000000001165 | what are all of the <Jump Phrase> for the <File> |
| 000000001167 | what is current <Jump Phrase> for all <File> |
| 000000001169 | what is the status of <Jump Phrase> for all of the <File> |
| | Class: 054 Go to EQ level by phrase |
| 000000001497 | i want to see another <File> |
| 000000001498 | another <File> please |
| 000000001516 | i want to focus on a <File> |
| 000000001517 | lets look at a paticular <File> |
| 000000001600 | another <File> |
| 000000001631 | go to the <File> level |
| 000000001633 | i want to see <File> |
| 000000001634 | show me the <File> |
| 000000001635 | look at <File> |
| 000000001636 | tell me about <File> |
| 000000001637 | what is the status of <File> |
| 000000001638 | i need to know about <File> |
| 000000001639 | goto the <File> area |

We claim:

1. A method of creating a natural language interface for a computer application, the computer, interface, and application together comprising a system, which interface allows a user to direct functions of the system with natural language input, comprising:

(a) based on a plurality of functions of the system, anticipating the general meaning of each of a plurality of likely user input sentences and storing in the computer a plurality of general meaning nodes, one for each anticipated user input general meaning;

(b) for a plurality of general meaning nodes, associating each node with a function, entering at least one typical anticipated user-input sentence which conveys the general meaning of the node, generating a pattern from the words of the typical sentence, and storing the typical sentence pattern in the computer;

(c) receiving from a user an input sentence and generating a pattern from the words of the input sentence;

(d) applying an algorithm stored in the computer to select which one of the plurality of general meaning nodes is intended by the user by comparing the input sentence pattern to the typical sentence patterns; and (e) executing the function associated with the selected general meaning node.

2. The method of claim 1 further comprising:

(a) identifying an object of the system that can be directed by the user, anticipating object terms that a user is likely to use to refer to the object, and storing the object terms in the computer with an associated reference to the object;

(b) in the process of generating a typical sentence pattern from a typical sentence, replacing the object terms with a general category code and;

(c) in the process of generating an input sentence pattern from an input sentence, replacing the object terms with the general category code.

3. The method of claim 2 further comprising:

(a) adjusting the algorithm to also consider whether object terms are contained in the input sentence.

4. The method of claim 2 further comprising:

(a) for a general meaning node, specifying an action to be taken by the system when the general meaning node is selected, which action specifies the general category code, and;

(b) when the general meaning node is selected, replacing the general category code within the action with the associated reference to the object and executing the action.

5. The method of claim 3 further comprising:

(a) anticipating node terms that a user is likely to use to refer to a general meaning node and storing the node terms in the computer;

(b) in the process of generating a pattern from a typical sentence, replacing the node terms with a general category code;

(c) in the process of generating a pattern from an input sentence, replacing the node terms with the general category code; and (d) adjusting the algorithm to also consider whether the input sentence includes the node terms.

6. The method of claim 3 further comprising:

(a) anticipating node group terms that a user is likely to use to refer to the subject matter of a group of general meaning nodes and storing the node group terms in the computer with a reference to the group of general meaning nodes;

(b) in the process of generating a pattern from a typical sentence, replacing the node group terms with a general category code;

(c) in the process of generating a pattern from an input sentence, replacing the node group terms with the general category code; and (d) adjusting the algorithm to also consider whether the input sentence includes the node group terms.

7. The method of claim 1 further comprising:

(a) organizing the general meaning nodes with determinable relationships between them;

(b) as a node is selected, storing in a memory the last previously selected node;

(c) adjusting the algorithm to also consider the relationship between the last previously selected node and the general meaning nodes.

8. The method of claim 7 further comprising:

(a) adjusting the algorithm to also consider the relationships between nodes selected prior to the last previously selected node and the general meaning nodes.

9. The method of claim 8 further comprising:

(a) associated with each of a plurality of the general meaning nodes, storing information regarding each node;

(b) adjusting the algorithm to also consider the information stored in the computer in association with the last previously selected node or nodes selected prior to the last previously selected node.

10. The method of claim 3 further comprising:

(a) storing a record of object terms entered by the user in a plurality of successive input sentences;

(b) adjusting the algorithm to also consider object terms entered by the user in input sentences prior to the current input sentence.

11. The method of claim 5 further comprising:

(a) storing a record of node terms entered by the user in a plurality of successive input sentences;

(b) adjusting the algorithm to also consider node terms entered by the user in input sentences prior to the current input sentence.

12. The method of claim 6 further comprising:

(a) storing a record of node group terms entered by the user in a plurality of successive input sentences;

(b) adjusting the algorithm to also consider node group terms entered by the user in input sentences prior to the current input sentence.

13. The method of claim 4 further comprising:

(a) before executing the action, presenting to the user a selected typical sentence and seeking confirmation from the user that the input sentence has the same general meaning as the typical sentence.

* * * * *